(12) United States Patent
Herlihy et al.

(10) Patent No.: US 8,618,231 B2
(45) Date of Patent: Dec. 31, 2013

(54) ACRYLATED EPOXY-AMINE OLIGOMERS

(75) Inventors: Shaun Herlihy, Chatham (GB); Luisa Fuertes, London (GB)

(73) Assignee: Sun Chemical B.V., Weesp (NL)

( * ) Notice: Subject to any disclaimer, the term of this patent is extended or adjusted under 35 U.S.C. 154(b) by 253 days.

(21) Appl. No.: 13/125,260

(22) PCT Filed: Oct. 19, 2009

(86) PCT No.: PCT/EP2009/063692
§ 371 (c)(1),
(2), (4) Date: Apr. 28, 2011

(87) PCT Pub. No.: WO2010/046351
PCT Pub. Date: Apr. 29, 2010

(65) Prior Publication Data
US 2011/0201744 A1   Aug. 18, 2011

Related U.S. Application Data

(60) Provisional application No. 61/107,030, filed on Oct. 21, 2008.

(51) Int. Cl.
C08F 18/00 (2006.01)
C08F 118/02 (2006.01)
C08F 283/10 (2006.01)
C08G 18/42 (2006.01)

(52) U.S. Cl.
USPC ............ 526/320; 526/319; 524/500; 525/530

(58) Field of Classification Search
USPC .................... 524/500; 525/530; 526/319, 320
See application file for complete search history.

(56) References Cited

U.S. PATENT DOCUMENTS

| 4,081,492 A | | 3/1978 | Traenckner et al. |
| 5,612,388 A | | 3/1997 | Irizawa et al. |
| 5,756,829 A | * | 5/1998 | Meixner et al. ............... 560/209 |
| 7,494,747 B2 | * | 2/2009 | Hayase et al. ................... 430/1 |
| 2005/0196679 A1 | * | 9/2005 | Hayase et al. ................... 430/1 |

FOREIGN PATENT DOCUMENTS

| DE | 154985 A1 | | 5/1982 |
| EP | 1876166 A1 | * | 1/2008 |
| JP | 58018288 A | | 2/1983 |
| JP | 6210175 A1 | | 1/1987 |
| JP | 8143614 A | | 6/1996 |

OTHER PUBLICATIONS

International Search Report PCT/EP2009/063692, Date of Mailing Jul. 12, 2009.

* cited by examiner

*Primary Examiner* — Michael Bernshteyn

(57) ABSTRACT

A reactive component suitable for use in a radiation-curable composition, which comprises an acrylated epoxy-amine oligomer represented by the formula (I): C-B-[A-B]$_n$-A-B-C wherein: n is from 2 to 500; each A is individually a unit derived from a diglycidyl ether; each B is individually a unit derived from a difunctional secondary amine or a monofunctional primary amine; and each C is individually a unit derived from a multifunctional acrylate monomer, radiation-curable compositions, such as inks, coatings and adhesives, comprising said reactive component and methods of making said reactive component.

24 Claims, No Drawings

ACRYLATED EPOXY-AMINE OLIGOMERS

This application a national stage application of PCT/EP2009/063692, filed on Oct. 19, 2009, which claims priority to U.S. Provisional Application No. 61/107,030, filed Oct. 21, 2008, all of which are hereby incorporated by reference in their entirety.

FIELD OF THE INVENTION

The present invention relates to oligomers for use in radiation-curable compositions, such as inks coatings and adhesives, and, in particular, compositions that can be applied via offset printing techniques, compositions comprising those oligomers and methods of printing using such compositions.

BACKGROUND

Radiation curable compositions include reactive components such that a radiation induced curing reaction takes place on exposure of the composition to radiation, including Electron Beam (EB) radiation and actinic radiation, such as Ultra Violet (UV) radiation. The reactive components include functional groups which react with one another in the radiation induced curing reaction to form chemical cross-links thus providing a hardened cured film. Free-radical curable components include functional groups that cross-link under irradiation via a free radical mechanism to form a hardened film.

U.S. Pat. No. 5,756,829 (BASF) describes amine-modified epoxy (meth)acrylates that for use as radical-curable binders which are the product of (a) reacting an epoxy functional compound with acrylic acid and/or a methacrylic acid, and then (b) reacting the product of step (a) with a basic nitrogen compound such that the epoxy groups originally present are substantially completely reacted. For example, almost all of the epoxy groups in bisphenol A diglycidyl ether are reacted with acrylic acid, and then the remaining epoxy groups are reacted with an amine (mol ratio 0.01-0.2 amine:1 epoxy), such as ethanolamine or cyclohexylamine, to give an amine modified epoxy acrylate compound. Additional acrylate monomers can be added to reduce the viscosity.

East German patent DD 208365 describes high molecular weight, soluble addition polymers created by the reaction of a bisphenol A epoxy compound with a primary monoamine. The hydroxy groups formed by the ring opening reaction of the epoxides are then reacted with anhydride compounds such as acetic, methacrylic, acrylic or cinnamic anhydride. East German patent DD154985 describes similar high molecular weight soluble addition polymers in which aromatic diglycidyl ethers such as bisphenol A diglycidyl ether are reacted with various simple alkyl or aryl primary monoamines at a mol ratio of 1:1.

WO 2008/000696 (Cytec surface specialties) describes the reaction product by Michael addition of an epoxy acrylate oligomer (optionally diluted with a multifunctional monomer) with a simple primary or secondary amine such as ethanolamine, butylamine, or dodecylamine. The epoxy acrylate oligomer is a material which is the reaction product of an epoxy compound with the acrylic acid. WO 2006/131259 (Cytec surface specialties) describes the reaction product of Michael addition of an ethoxylated or propoxylated multifunctional acrylate monomer with a simple primary or secondary amine compound, such as butylamine, diethanolamine, diethanolamine, morpholine. Typically, this is to produce an aminoacrylate synergist capable of reaction with a Type II Photoinitiator. The preferred amines are alkylamines and dialkylamines, more particularly those where the alkyl group, each independently, comprised from 1 to 12 carbon atoms, preferably from 1 to 8 carbon atoms, optionally substituted by an hydroxy group.

There remains a need for new classes of oligomers suitable for use in radiation-curable compositions, such as UV or ER-curable inks, coatings and laminating adhesives.

SUMMARY OF THE INVENTION

The present invention relates to the radiation-curable Michael addition product of a multifunctional acrylate monomer with a secondary amine-terminated oligomer which is the reaction product of a diglycidyl ether and an amine which is a difunctional secondary amine, a monofunctional primary amine or a combination of a difunctional secondary amine and a monofunctional primary amine.

In a first aspect, the present invention provides amine terminated copolymers of a diglycidyl ether and a difunctional secondary amine or a monofunctional primary amine, or mixture of both, subsequently reacted with a multifunctional acrylate monomer to give a polymer useful in UV or EB cured compositions, such as inks and coatings. The polymer of the first aspect of the invention is therefore a reactive component useful in UV- or EB-curable compositions.

In a second aspect, the invention provides a reactive component suitable for use in a radiation-curable composition, wherein said reactive component is the reaction product of: (a) an amine-terminated copolymer and (b) a multifunctional acrylate monomer wherein said amine-terminated copolymer is the reaction product of (i) a diglycidyl ether and (ii) an amine selected from a difunctional secondary amine or a monofunctional primary amine or a mixture thereof.

In a third aspect, the invention provides a reactive component suitable for use in a radiation-curable composition, which comprises a polymer represented by the formula (I):

$$C\text{-}B\text{-}[A\text{-}B]_n\text{-}A\text{-}B\text{-}C \qquad (I)$$

wherein:
n is from 2 to 500;
each A is individually a unit derived from a diglycidyl ether;
each B is individually a unit derived from a difunctional secondary amine or a monofunctional primary amine; and
each C is individually a unit derived from a multifunctional acrylate monomer.

In another, the invention provides the polymer represented by the formula (I) as defined above.

In a fourth aspect, the invention provides a method of preparing a reactive component suitable for use in a radiation-curable composition, said method comprising the steps of: (a) providing an amine-terminated copolymer which are the reaction product of (i) a diglycidyl ether, and optionally a monoglygidyl ether, and (ii) an amine, which includes two secondary or one primary amine group(s) and optionally a further functional group; and then (b) reacting the copolymers provided in step (a) with a multifunctional acrylate monomer; the method optionally comprising the further step (c) of modifying the optional further functional group. Optional step (c) may either precede or proceed step (b). The method of the fourth aspect of the invention is advantageously suitable for preparing the reactive component of any one of the first, second or third aspects of the invention.

In a fifth aspect, the invention provides a radiation-curable composition comprising the reactive component of any one of the first, second or third aspects of the invention. Preferably, the radiation-curable composition comprises at least one further radiation curable component. In one embodiment, the radiation curable composition of the fifth aspect of the invention is a composition which is curable on exposure to UV or EB radiation and which comprises a reactive component suitable for use in a UV or EB-curable composition, wherein said reactive component is the reaction product of: (a) an amine-terminated copolymer and (b) a multifunctional acrylate monomer, wherein said amine-terminated copolymer is the reaction product of (i) a diglycidyl ether and (ii) an amine selected from a difunctional secondary amine or a monofunctional primary amine or a mixture thereof. In another embodiment, the radiation-curable composition of the fifth aspect of the invention is a composition which is curable on exposure to UV or EB radiation and which comprises a reactive component represented by the formula (I) as defined above.

The reactive component of the invention have typically been found to be simple and quick to make, and may therefore be manufactured at relatively low cost. In some embodiments, the reactive components may be prepared by procedures that do not require the use of solvents and/or catalysts. The reactive components of the invention are typically highly functional, containing a large number of, for example 4 or more, especially 6 or more, functional groups that are capable of cross-linking during a curing reaction. The reactive components of the present invention have been found to provide compositions, such as ink, coating and adhesive compositions, with desirable properties.

In particular, it has been found that the radiation-curable compositions of embodiments of the invention, and especially highly functional reactive components, cure to provide cured cross linked products which exhibit advantageously low levels of migration of components derived from the reactive components of the invention and/or reactive monomer that were also present in the radiation-curable composition. In contrast to many known radiation-curable compositions, the present invention advantageously provides compositions that exhibit good curing properties when irradiated with EB radiation.

The present invention has been found to provide access to a range of reactive components whose properties can advantageously be selected to suit different applications, such as different lithographic applications. Similarly, the methods of the invention can advantageously be tailored to provide oligomeric products having desired properties. For example, the amine and/or the multifunctional acrylate used to prepare the reactive components of the invention and/or used in the method of the invention can be selected so as to provide a reactive component with particular properties, such as viscosity or hydrophobicity.

DETAILED DESCRIPTION OF THE INVENTION

In one aspect of the invention, the amine-terminated copolymer used in preparing the reactive components are the product of reacting (i) a diglycidyl ether and (ii) a difunctional secondary amine, a monofunctional primary amine or a mixture thereof, in a condensation reaction in which, for example, an amine group reacts with an epoxy group in the diglycidyl ether to provide a new N—C bond and a water molecule.

In a further aspect of the invention, the amine-terminated copolymer is the product of reacting (i) a diglycidyl ether with (ii) a difunctional secondary amine, a monofunctional primary amine or a mixture thereof, in the presence of a monoglycidyl ether. Thus, the amine with reacted with a mixture of a diglycidyl ether and a monoglycidyl ether. In embodiments in which the diglycidyl ether is reacted with the amine in the presence of a monoglycidyl ether, a proportion of copolymer is produced that terminates, at least at one end, at a group (A') derived from a monoglycidyl ether. Monoglycidyl ethers, such as alkyl monoglycidyl ethers may, advantageously, be used to control molecular weight and/or properties of polymers. Advantageously, the ratio of diglycidyl ethers to monoglycidyl ethers in the mixture is at least 5:1, for example at least 8:1 and especially at least 14:1. In one embodiment the ratio of diglycidyl ethers to monoglycidyl ethers in the mixture is at least 20:1. In a further aspect of the invention, the diglycidyl ether is reacted with the amine in the absence of a monoglycidyl ether. The diglycidyl ether may, for example, be one of a mixture of diglycidyl ethers that comprises two or more diglycidyl ethers. Thus, in one embodiment, the amine-terminated copolymers are the product of reacting (i) a mixture of two or more diglycidyl ethers and, optionally, a monoglycidyl ether, with (ii) a difunctional secondary amine, a monofunctional primary amine or a mixture thereof. Use of a mixture of diglycidyl ethers has been found to be advantageous in enabling the performance properties of the resulting reactive component to be tuned.

The mixture of amines may, for example, comprise more than one difunctional secondary amine and/or more than one monofunctional primary amine. Thus, in one embodiment, the amine-terminated copolymers are the reaction product of (i) a diglycidyl ether or a mixture of diglycidyl ethers, and optionally a monoglycidyl ether, and (ii) a mixture of amines comprising at least two amines selected from difunctional secondary amines and monofunctional primary amines.

In one aspect of the invention, the amine-terminated copolymer is the reaction product of (i) the diglycidyl ether and (ii) the difunctional secondary amine, monofunctional primary amine or mixture thereof, in the presence of a monofunctional secondary amine or other amine that is only capable of undergoing a single condensation reaction with a glycidyl ether, such as a sterically hindered monofunctional primary amine. The inclusion of a monofunctional secondary amine has been found to enable the molecular weight (size) of the copolymer to be controlled. In embodiments in which the diglycidyl ethers are reacted with a mixture of amines, the order of addition of the amines may be selected in order to influence which amine is the typically the terminal amine of the resulting amine-terminated copolymer. Thus, in one embodiment, the copolymer is the product of (aa) reacting a diglycidyl ether with a first amine and then subsequently (ab) reacting the product of step (aa) with a second amine. The first amine is advantageously an amine selected from a difunctional secondary amine and a monofunctional primary amine. The second amine is advantageously selected from a difunctional secondary amine, a monofunctional primary amine or a monofunctional secondary amine.

The terms "monofunctional" and "difunctional" refer to the number of separate amine functional groups present in the amine compound. Thus, the term "monofunctional primary amine" refers to a compound having a single primary amine group. A primary amine group has two reactive N—H bonds and which is, for example, converted to a secondary amine following a condensation reaction or a Michael addition. Similarly, the term "difunctional secondary amine" refers to a compound having two secondary amine groups. Each of the two secondary amine groups in a difunctional secondary amine have a single reactive N—H bond. Thus, both monofunctional primary amines and difunctional secondary amines are compounds that include two reactive N—H bonds, either on the same nitrogen atom in a single primary amine group or on two separate nitrogen atoms in two secondary amine groups.

The copolymer of the invention comprises units (A) derived from the diglycidyl ether alternating with units (B) derived from the amine. Amine-terminated copolymers terminate in a unit (B') derived from the amine. The copolymer produced in step (a) advantageously terminates in a unit (B') at both ends. Typically, at least one of the terminal units (B') includes a secondary amine group and, as such, the copolymer is a secondary amine-terminated copolymer. Where the terminal unit (B') is derived from a difunctional secondary amine, the terminal unit (B') advantageously contains a secondary amine group that did not react with a diglycidyl ether in step (a). Where the terminal unit (B') is derived from a monofunctional primary amine, the terminal unit (B') advantageously contains a secondary amine group that is produced when a primary amine reacts with a single epoxy group in a glycidyl ether molecule to form a secondary amine. In embodiments in which the diglycidyl ether is reacted with the amine or mixture of amines in the presence of a monofunctional secondary amine, a proportion of terminal units (B') include a tertiary amine group and do not include a reactive N—H bond.

A copolymer of then invention may, for example, be represented by the formula (II):

B'-[A-B]$_n$-A-B'  (II)

wherein n is from 2 to 500, preferably from 2 to 200, more preferably, from 2 to 100, for example, from 3 to 50, such as from 5 to 50;
each A is individually a unit derived from a diglycidyl ether; and
each B is individually a unit derived from a difunctional secondary amine or a monofunctional primary amine; and
each B' is individually a terminal amine group.

In one aspect of the invention, the amine-terminated copolymer has a molecular weight (Mw) in the range of from 2000 to 15000, for example from 2000 to 12000, such as from 3000 to 10000.

The amine-terminated copolymer is produced by reacting an excess of amines with the glycidyl ethers, i.e. an amine to glycidyl ether ratio of greater than 1:1, for example a ratio of at least 1.1:1, such as a ratio of at least 1.15:1. In some embodiments an amine to glycidyl ether ratio of 1.2:1 or more has been found to be particularly suitable. In one aspect of the invention an amine to glycidyl ether ratio of no more than 2:1, for example no more than 1.5:1, such as no more than 1.4:1, is preferred. It has been found that an amine to glycidyl ether ratio of from 1.1:1 to 1.5:1, for example from 1.1: to 1.3:1, such as approximately 1.2:1, products of the formula (I) with desirable properties, such as a desirable chain length.

In one aspect of the invention, the reactive component is prepared by reacting secondary amine groups in the amine-terminated copolymer with a multifunctional acrylate to provide a product that includes an alternating chain of units (A) derived from the diglycidyl ether with units (B) derived from the amine, which chain is terminated, and preferably terminated at either end, by groups (C) derived from the multifunctional acrylate monomer. In one aspect, the reactive component of the invention may be represented by the formula (I):

C-B-[A-B]$_n$-A-B-C  (I)

wherein:
wherein n is from 2 to 500, preferably from 2 to 200, more preferably, from 2 to 100, for example, from 3 to 50, such as from 5 to 50;
each A is individually a unit derived from a diglycidyl ether;
each B is individually a unit derived from a difunctional secondary amine or a monofunctional primary amine; and
each C is individually a unit derived from a multifunctional acrylate monomer In one aspect of the invention, the reactive component of the invention has a weight average molecular weight (Mw) in the range of from 2000 to 15000, for example from 2000 to 12000, such as from 3000 to 10000.

In one aspect of the invention, an excess of multifunctional acrylate is reacted with the amine-terminated copolymer, i.e. a ratio of multifunctional acrylate to amine-terminated copolymer of greater than 2:1, for example a ratio of at least 3:1, such as a ratio of at least 4:1. For example, an excess of multifunctional acrylate may be reacted with the amine-terminated copolymer in step (b) of the second aspect of the invention. In some embodiments an amine to copolymer ratio of 5:1 or more has been found to be particularly suitable. In one aspect of the invention an amine to copolymer ratio of no more than 10:1, for example no more than 5:1, such as no more than 7:1 is preferred. It has been found that an amine to diglycidyl ether ratio of from 1.1:1 to 1.3:1, for example approximately 1.2:1 in step (a) produces products of the formula (I) with desirable properties, such as a desirable chain length. Typically, a single type of multifunctional acrylate is reacted with the amine terminated copolymer in step (b), although, a mixture comprising more than one type of monofuntional acryalate may be used in some embodiments of the invention.

The reactive component is advantageously free radical-curable, whereby reactive groups present in the reactive component react with one another in a free radical mechanism to cross-link and form a cured polymer. In one aspect of the invention, the reactive component is curable on exposure to EB radiation. Reactive components that are curable on exposure to EB radiation are preferably free from moieties that act as electron sinks and which interfere with curing processes. Many aromatic groups act as electron sinks and, as such, the reactive component of the invention may, for example, be free of aromatic groups. Alternatively, the reactive component of the invention may only include aromatic groups that do not act as electron sinks such as bisphenol A groups. Preferably, the diglycidyl ether is non-aromatic. Preferably, the monofuntional primary amine and/or difunctional secondary amine is non-aromatic. In one aspect of the invention, the reactive component is curable on exposure to actinic radiation, preferably ultraviolet (UV) radiation. For example, the reactive component may be included in a composition that also includes a photoinitiator which, on exposure to UV radiation generated free radicals that initiate a free-radical chain reaction that is propagated by the acrylate groups present in the reactive component.

In one aspect of the invention, the diglycidyl ether is an aliphatic diglycidyl ether. In a further aspect, the diglycidyl ether is a polyalkylene glycol diglycidyl ether, for example a polyC$_{2-5}$alkylene glycol diglycidyl ether, such as a polyC$_{2-3}$alkylene glycol diglycidyl ether. Suitable polyalkylene glycol diglycidyl ethers, include polyethylene glycol diglycidyl ether and polypropylene glycol diglycidyl ether. The use of aliphatic diglycidyl ethers such as polyalkylene glycol diglycidyl ethers, has been found to be particularly beneficial in inks and coatings for EB curing as they enable a formulation to be prepared that does not include undesirable aromatics compounds. The diglycidyl ether typically has a weight average molecular weight (Mw) of 1200 or less, for example 1000 or less such as 800 or less. In some embodiments diglycidyl ethers having a Mw of 500 or less may be used.

In one aspect of the invention, the amine is an aliphatic amine. Advantageously, the amine is a primary amine, for example a primary aliphatic amine. The use of primary amines may, advantageously, enable the hydrophobicity of the reactive components of the invention to be controlled. For example, the hydrophobicity may be increased by selecting a primary amine with a longer chain length and reduced by selecting a primary amine with a shorter chain length. In one aspect of the invention, the primary amine is an alkylamine, for example, a $C_{2-20}$alkyl amine, such as a $C_{4-14}$alkyl amine. The amine typically has a weight average molecular weight (Mw) of 300 or less, for example 200 or less, such as 180 or less.

In one embodiment, the amine includes a further functional group (other than an amine group) that can be modified in order to adjust the hydrophobicity of the final reactive component of the invention. The further functional group is advantageously not a nucleophilic group that reacts with the epoxy groups in the diglycidyl ether. For example, the amine may include one or more hydroxyl groups, such as a primary alcohol functional group, that can be converted, for example, to an ether, ester or amide group to reduce the hydrophobicity, if required. In one embodiment the amine includes a primary alcohol functional group, which advantageously can be modified, for example, by a reaction with an isocyanate, such as a monofunctional isocyanate, ester or activated carboxylic acid (such as an acyl chloride), for example in the presence of base. The functional group in the unit derived from the amine is functionalized in optional step (c) of the method of the fourth aspect of the invention. Optional step (c) may either precede or proceed step (b).

The reactive component of the invention includes functional groups in the portion of the molecule derived from the multifunctional acrylate (C), which are capable of cross-linking in a radiation induced curing reaction thus hardening a coating or ink composition comprising the reactive component. The multifunctional acrylate is a di-, or higher-functional acrylate. In a further aspect of the invention, the multifunctional actylate is a tri- or higher-functional acrylate, for example a tri-, tetra-, penta- or hexa-functional acrylate. In one embodiment, the multifunctional acrylate is a tri- or tetra-functional acrylate, especially a tetra-functional acrylate.

In one embodiment, the invention provides a method of preparing a reactive component suitable for use in a radiation-curable composition, which is represented by the formula (I):

C-B-[A-B]$_n$-A-B-C    (I)

wherein:
n is from 2 to 500;
each A is individually a unit derived from a diglycidyl ether;
each B is individually a unit derived from a difunctional secondary amine or a monofunctional primary amine; and
each C is individually a unit derived from a multifunctional acrylate monomer, said method comprising the steps of:
a) providing an amine-terminated copolymer with is the reaction product of a diglycidyl ether and an amine, which comprises two secondary amine groups or one primary amine groups and optionally a further functional group, said amine-terminated copolymer having the formula (II):

B'-[A-B]$_n$-A-B'    (II)

wherein n, A and B are as defined above for compounds of formula (I) and B' is a unit derived from the amine that includes a reactive secondary amine group;
and then
b) reacting the copolymer formed in step (a) with a multifunctional acrylate monomer to form the reactive component.

In one embodiment the invention provides a method of preparing a reactive component suitable for use in an ink or coating composition, which composition is curable on exposure to UV or EB radiation, and which is represented by the formula (Ia):

C-B''-[A-B'']$_n$-A-B''-C    (Ia)

wherein:
n is from 2 to 500;
each A is a individually unit derived from a diglycidyl ether;
each B'' is individually a unit derived from a difunctional secondary amine or a monofunctional primary amine which comprises a further functional group that has been modified; and
each C is individually a unit derived from a multifunctional acrylate monomer, said method comprising the steps of:
a) providing an amine-terminated copolymer with is the reaction product of a diglycidyl ether and an amine, which comprises two secondary amine groups or one primary amine groups and optionally a further functional group, said amine-terminated copolymer having the formula (II):

B'-[A-B]$_n$-A-B'    (II)

wherein n, A and B are as defined above for compounds of formula (I) and B' is a unit derived from the amine that includes a reactive secondary amine group;
and then
b) reacting the copolymer formed in step (a) with a multifunctional acrylate monomer to form the reactive component.
the method comprising the further step of
c) modifying the further functional groups present in the units B and/or B'; wherein step (c) either precedes or proceeds step (b).

In one aspect of the invention, the method comprises the further step of preparing the amine-terminated copolymer by reacting (i) a diglycidyl ether, and optionally a monoglygidyl ether, with (ii) an amine, which includes two secondary or one primary amine group(s) and optionally a further functional group.

The method of the invention is advantageously suitable for preparing the reactive component of any other aspect of the invention. Thus, the methods of the invention advantageously incorporate any features of the reactive components of the invention described herein. For example, a mixture of two or more diglycidyl ethers may be reacted with the amine to in the methods of the invention to provide an amine-terminated copolymer reaction product. In another example, from 1.1 to 1.5 equivalents of amine may be reacted with one equivalent of glycidyl ether in the method of the invention to provide an amine-terminated copolymer reaction product. In a further example, at least 2 equivalents, preferably at least 2.1 equivalents, of multifunctional acrylate to one equivalent of amine-terminated copolymer is used in step b. of the method of the invention to provide a reactive component.

In one aspect, the radiation-curable composition of the fifth aspect of the invention is an ink or coating composition. In another aspect the radiation-curable composition is an adhesive, for example, a laminating adhesive. The radiation-curable composition of the fifth aspect of the invention is advantageously a shelf-stable composition that is cured only on exposure to radiation, preferably UV or EB radiation. Preferably, the adhesive is a single component adhesive that is curable on exposure to radiation. Preferably the adhesive and is not a, or a constituent of a, multicomponent adhesive system that cures on admixing two or more components, such as a polymerisable component and a separate activator component.

In one aspect of the invention, the radiation-curable composition is suitable for offset printing. In other aspects of the invention, the composition is suitable for use as a screen ink, an ink jet, a gravure ink or a flexo ink, for example, an ink jet ink or a screen ink, especially a screen ink.

In one embodiment, the invention provides a radiation-curable composition, advantageously a UV-curable composition, that includes a free radical photoinitiator. The free radical photoinitiator is a compound that generates free radicals on exposure to actinic radiation, and in particular UV light, to initiate a free radical curing reaction.

Advantageously, the free radical photoinitiator is present in an amount greater than 0.1% by weight based on the total weight of the composition, preferably in an amount greater than 0.5% by weight based on the total weight of the composition and more preferably in an amount greater than 1% by weight based on the total weight of the composition. Advantageously, the free radical photoinitiator is present in an amount less than 10% by weight, preferably less than 5% by weight, based on the total weight of the composition. Suitable free radical photoinitiators will be known to the skilled person.

In one embodiment, the invention provides a radiation-curable composition that is curable on exposure to EB radiation. Exposure to EB radiation advantageously initiates a free radical reaction thereby curing free radical-curable monomers. Thus, free radical-curable monomers present in the composition may, optionally, be cured on exposure to EB radiation in the absence of a free radical photoinitiator. Accordingly, in one embodiment the radiation-curable composition of the invention is substantially free of photoinitiators.

An ink composition of the invention preferably includes a colorant. The colorant may be a pigment or a dye.

The radiation-curable component of the invention are especially suited for use in inks, especially printing inks, including lithographic inks. These typically comprise, as is known in the art, as additional components to those referred to above, one or more of colorants, waxes, stabilizers, wetting agents, silicones, surfactants and flow aids, for example as described in "Printing Ink Manual" fourth edition Leach R. H. et al. (eds.) Van Nostrand Reinhold, Wokingham, (1988), the disclosure of which is incorporated herein by reference.

The radiation-curable component of the invention are especially suited for use in coating compositions. Additives which may be included in the coating formulations of the present invention include, as is known in the art, stabilizers, plasticisers, pigments, waxes, slip aids, leveling aids, adhesion promoters, wetting agents, silicones, surfactants and fillers, for example as described in "Printing Ink Manual" fourth edition Leach R. H. et al. (eds.) Van Nostrand Reinhold, Wokingham, (1988), the disclosure of which is incorporated herein by reference.

The radiation-curable composition of the fifth aspect of the invention may optionally include one or more reactive monomers in addition to the reactive component of the first to third aspects of the invention. The reactive monomers are preferably multifunctional monomers that include includes two or more functional groups that are capable of cross-linking in a radiation induced curing reaction. In one aspect, the multifunctional monomer is a di-, tri- or tetra-functional monomer. Preferably, the multifunctional monomer is a tri- or tetra-functional monomer, especially a tetra-functional monomer. The monomer may, for example, be a multifunctional acrylate group. In one embodiment, excess of multifunctional acrylate used in producing the reactive component in step (b) is retained or carried forward into a radiation-curable composition of the invention. Advantageously, reactive monomers make up from 0 to 50% by weight of the total composition, for example from 2 to 40% by weight, such as from 5 to 30% by weight. In some embodiments the reactive component of the first, second or third aspect of the invention is the sole reactive component in the radiation-curable composition of the fifth aspect of the invention.

EXAMPLES OF THE INVENTION

Certain illustrative embodiments of the invention will now be described in detail, by way of typical examples of the invention. These examples should not be construed as limiting. Examples 1-75 below describe the preparation of oligomers prepared by the reaction of difunctional epoxy compounds with an excess of difunctional secondary amine and/or monofunctional primary amine, the resultant secondary amine terminated oligomer being reacted with a multifunctional acrylate monomer via the Michael addition reaction. Example 76 describes the preparation and testing of EB curable inks using some of these oligomers. Example 77 describes the preparation and testing of two UV curable inks using oligomers from the previous examples.

Scheme 1 shows a typical method according to the fourth aspect of the invention by which a reactive component of the first to third aspects of the invention may be prepared, in which a diglycidyl ether, for example the polypropylene glycol diglycidyl ether (4), is reacted with an amine, for example the difunctional secondary amine, piperazine (5), in step (a) to form an copolymer, for example the secondary amine-terminated copolymer (2), which is subsequently reacted with a multifunctional acrylate, for example the tetrafunctional acrylate, ethoxylated pentaerythritol tetraacrylate (3), in step (b) to form the reactive component, for example oligomer (1).

Scheme 1

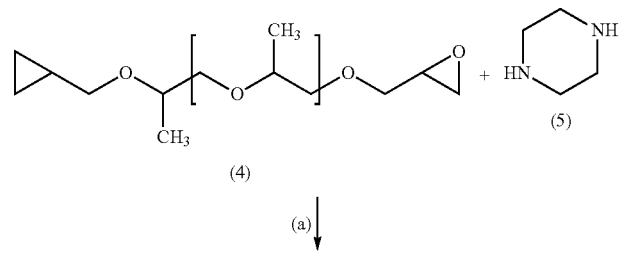

(4)

(5)

(a)

11
12
-continued
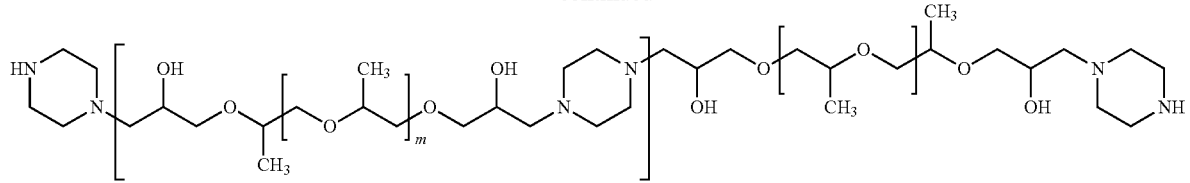
(2)
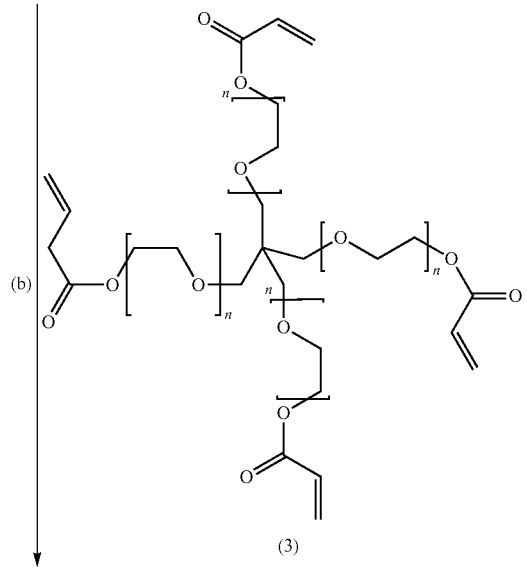
(3)
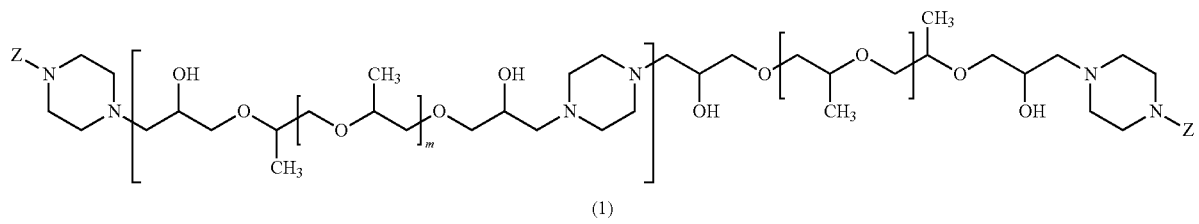
(1)
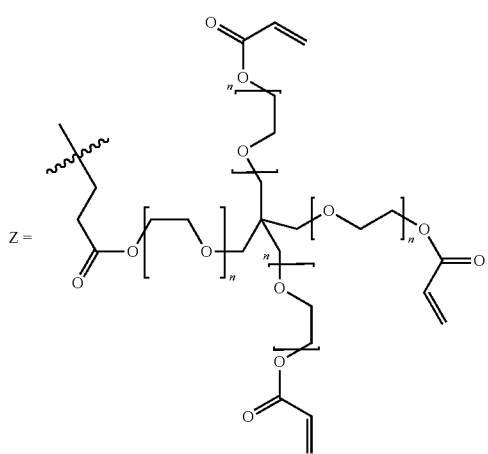

Example 1

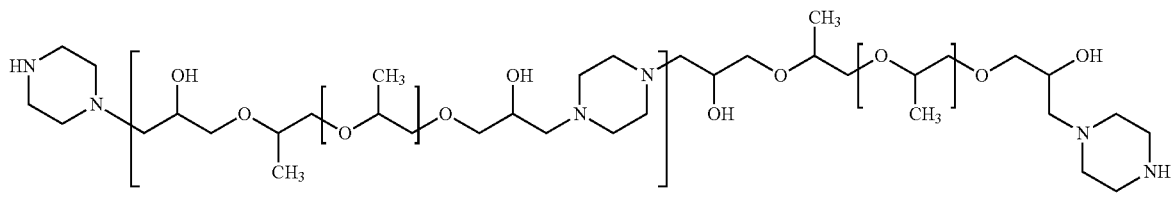

200 g of polypropylene glycol diglycidyl ether (Mw: 640) (D.E.R™ 732P ex Dow) (0.3125 moles) and 32.25 g of piperazine (0.375 moles) were mixed in a reaction vessel equipped with a stirrer, a condenser and a temperature probe. The mixture was held at 30° C. for 7 hours and then heated to 60° C. for 2 hours. The contents of the reaction vessel were then cooled to room temperature. The product is a viscous light yellow liquid.

Analysis: GPC: Mw 4820, Mn 1260; IR: OH str at 3448 $cm^{-1}$, epoxide CO str at 1254 $cm^{-1}$ no longer present.

Example 2

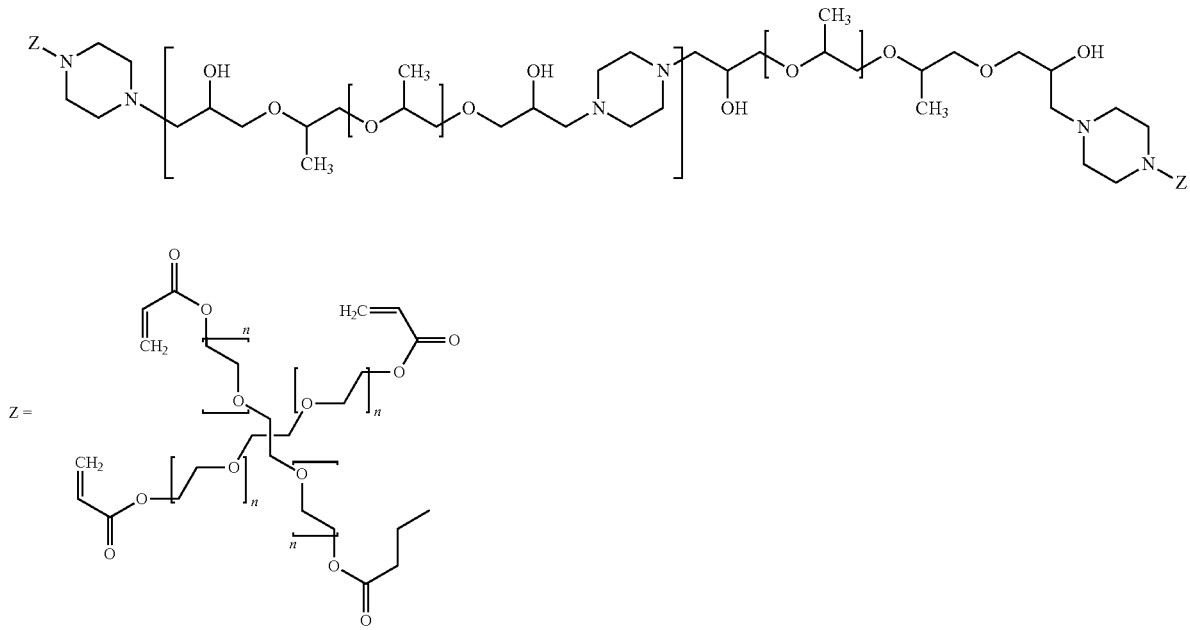

54.35 g of ethoxylated pentaerythritol tetraacrylate (SR 494 ex Sartomer) (0.103 moles) and 0.15 g of 2, 6 di-tert-butyl-4-methylphenol (BHT) (0.0007 moles) were mixed in a reaction vessel equipped with a stirrer, condenser and a temperature probe. 95.65 g (0.0257 moles) of the product obtained in example 1 were added into the mixture and heated to 60° C. for 2 hours. The contents of the reaction vessel were then cooled to room temperature. The product is a viscous light yellow liquid.

Analysis: GPC: Mw 7350 Mn 1555; IR: Secondary amine at 1642 $cm^{-1}$ no longer present

Example 3

188.21 g of D.E.R™ 732P ex Dow (0.294 moles) were added to the reaction vessel, equipped with a stirrer, condenser and a temperature probe and heated to 60° C. A solution of 30.35 g of piperazine (0.353 moles) in 80 g of water was then added. The mixture was held at 60° C. for 2 hours. The contents of the reaction vessel were then cooled to room temperature. The product is a viscous light yellow liquid, which was similar to that of Example 1. Note: The use of piperazine in water was found to be advantageous in controlling the exotherm.

Example 4

79.42 g of SR494 ex Sartomer (0.085 moles) and 0.15 g of 2, 6 BHT (0.0007 moles) were mixed in a reaction vessel equipped with a stirrer, air inlet, condenser and a temperature probe. 120.58 g (0.0.0325 moles) of the product obtained in Example 3 were then added slowly. The mixture was then heated to 60° C. and held at this temperature for 2 hours. The content of the reactor vessel were then cooled to room temperature and transferred to a rotary evaporator flask. Water was removed under vacuum with a constant flow of air bubbling through the product. The product is a viscous light yellow liquid that was similar to the product of Example 2.

Example 5

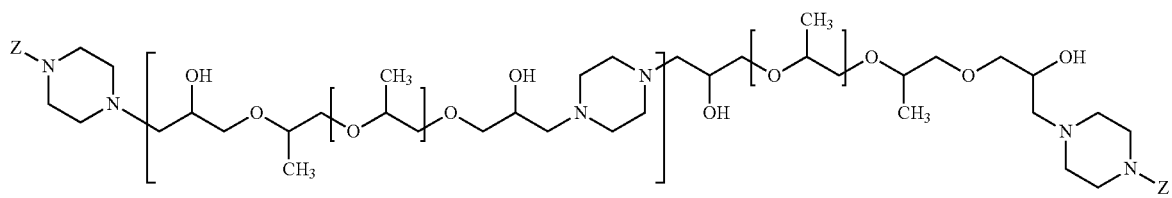

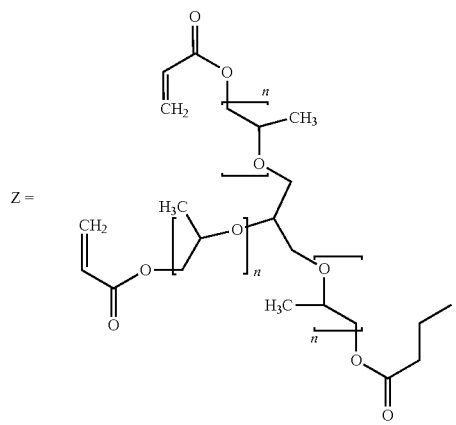

57.07 g of glycerol propoxylated triacrylate (OTA 480 ex Cytex) (0.133 moles) and 0.15 g of BHT (0.0007 moles) were mixed in a vessel equipped with a stirrer, condenser and a temperature probe. 92.93 g (0.025 moles) of the product obtained in Example 1 were added into the mixture. When addition was finished, the mixture was then heated to 60° C. for 2 hours. The contents of the reaction vessel were then cooled to room temperature. The product is a viscous light yellow liquid.

Analysis: GPC: Mw 7155 Mn 1400

Example 6

120.48 g (0.0324 moles) of the product obtained in Example 1 and 0.15 g of BHT (0.0007 moles) were mixed in a reaction vessel equipped with a stirrer, air inlet, condenser and a temperature probe. 79.52 g of SR 494 ex Sartomer (0.151 moles) were then added while high stirring. The mixture is then heated to 60° C. and held at that temperature for 2½ hours. The contents of the reaction vessel were then cooled to room temperature. The product is a viscous slight yellow liquid, which was similar to that obtained in Example 2.

Example 7

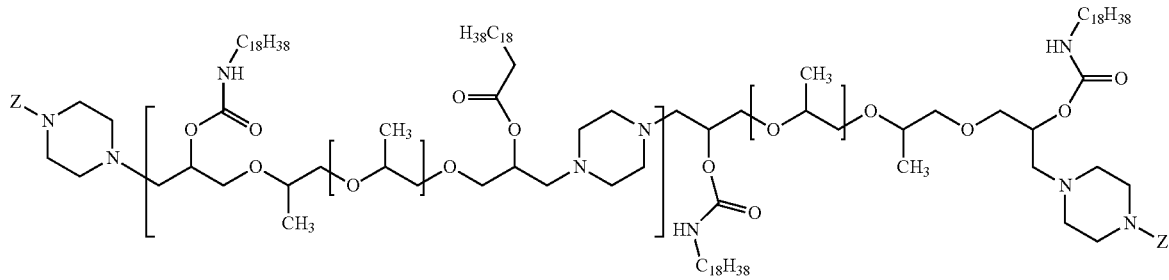

-continued

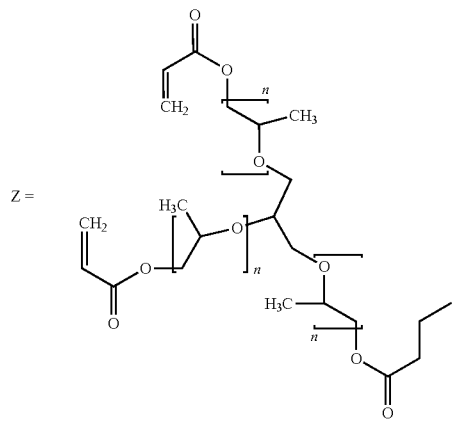

200 g of product obtained in Example 6, 47.9 g of octadecyl isocyanate (0.162 moles) and 0.5 g of dibutyltin laurate were mixed in a reaction vessel equipped with a stirrer, air inlet, condenser and a temperature probe and heated to 55° C.-60° C. and held at this temperature for 1½ hours. The contents of the reaction vessel were then cooled to room temperature. The product is a viscous opaque white liquid.

Analysis: GPC: Mw 7485, Mn 1585; IR: NH str from urethane at 3342 $cm^{-1}$

Example 8

145.16 g (0.0391 moles) of the product obtained in Example 1 and 0.25 g of BHT (0.0012 moles) were mixed in a reaction vessel equipped with a stirrer, air inlet, condenser and a temperature probe. The mixture was heated to 60° C., 95.81 g of SR 494 ex Sartomer (0.181 moles) were then added while high stirring. The mixture was held at 60° C. for 2½ hours and then cooled down to 35° C. 28.86 g of octadecyl isocyanate (0.098 moles) and 0.54 g of dibutyltin laurate were added. The mixture then was heated to 55°-60° C. and held at this temperature for 2 hours. The contents of the reaction vessel were then cooled to room temperature. The product is a viscous semi opaque liquid that was similar to that produced in the two step process of Examples 6 and 7.

Analysis: GPC: Mw 7830, Mn 1500

Example 9

80.41 g (0.0216 moles) of the product obtained in Example 1 and 0.15 g of BHT (0.0007 moles) were mixed in a reaction vessel equipped with a stirrer, air inlet, condenser and a temperature probe. Then 69.58 g of SR 494 ex Sartomer (0.132 moles) were added while high stirring and heated to 60° C. The mixture is then held at 60° C. for 2½ hours and then cooled down to RT. 47.95 g of octadecyl isocyanate (0.162 moles) and 0.40 g of dibutyltin laurate were added. The mixture then was heated to 55°-60° C. and held at this temperature for 4 hours. The contents of the reaction vessel were then cooled to room temperature. The product is a highly viscous opaque dark yellow liquid.

Analysis: GPC: Mw 8740, Mn 1545

Example 10

100 g of D.E.R™ 732P ex Dow (0.156 moles) were added to the reaction vessel, equipped with a stirrer, condenser and a temperature probe and heated to 60° C. A solution of 12.9 g of piperazine (0.15 moles) and 5.44 g of morpholine (0.062 moles) in 60 g of water were then added. The mixture was held at 60° C. for 3 hours. The contents of the reaction vessel were then cooled to room temperature. The product is a viscous light yellow liquid. The mixture of the amines including a low amount of a monofunctional secondary amine used in Example 10 provided a low molecular weight product.

Analysis: GPC: Mw 5350 Mn 1815

Example 11

44.98 g of SR494 ex Sartomer (0.085 moles) and 0.15 g of BHT (0.0007 moles) were mixed in a reaction vessel equipped with a stirrer, air inlet, condenser and a temperature probe. 100 g (0.014 moles) of the product obtained in Example 10 were then added slowly. The mixture was then heated to 60° C. and held at this temperature for 2½ hours. The content of the reactor vessel were then cooled to room temperature and transferred to a rotary evaporator flask. Water was removed under vacuum with a constant flow of air bubbling through the product. The product is a viscous light yellow liquid.

Example 12

100 g of D.E.R™ 732P ex Dow (0.156 moles) were added to the reaction vessel, equipped with a stirrer, condenser and a temperature probe and heated to 60° C. A solution of 14.51 g of piperazine (0.169 moles) and 7.54 g of dioctylamine (0.0312 moles) in 95 g of water were then added. The mixture was held at 60° C. for 3 hours. The contents of the reaction vessel were then cooled to room temperature. The product is a viscous light yellow liquid. Note: The mixture of the amines including a low amount of a monofunctional secondary amine used in Example 12 provided a low molecular weight product.

Analysis: GPC: Mw 5840, Mn 1100

Example 13

44.51 g of SR 494 ex Sartomer (0.084 moles) and 0.15 g of BHT (0.0007 moles) were mixed in a reaction vessel equipped with a stirrer, air inlet, condenser and a temperature probe. 120 g (0.0274) of the product obtained in Example 12 was then added slowly. The mixture was then heated to 60° C. and held at this temperature for 2 hours. The content of the reactor vessel were then cooled to room temperature and transferred to a rotary evaporator flask. Water was removed under vacuum with a constant flow of air bubbling through the product. The product is a viscous light yellow liquid.

Example 14

84.21 g of D.E.R™ 732P ex Dow (0.132 moles) and 50 g of polyethylene glycol diglycidyl ether (Mw: 380) (D.E.R™ 736P ex Dow) (0.132) were added to the reaction vessel, equipped with a stirrer, condenser and a temperature probe and heated to 60° C. A solution of 33.94 g of piperazine (0.395 moles) in 60 g of water was then added. The mixture was held at 60° C. for 2½ hours. The contents of the reaction vessel were then cooled to room temperature. The product is a viscous light yellow liquid. Note: The two polyethylene glycol diglycidyl ethers used were of differing molecular weights.
Analysis: GPC: Mw 4755, Mn 1219

Example 15

101.96 g of SR 494 ex Sartomer (0.193 moles) and 0.15 g of BHT (0.0007 moles) were mixed in a reaction vessel equipped with a stirrer, air inlet, condenser and a temperature probe. 48.04 g (0.0276 moles) of the product obtained in example 14 was then added slowly. The mixture was then heated to 60° C. and held at this temperature for 2 hours. The contents of the reactor vessel were then cooled to room temperature and transferred to a rotary evaporator flask. Water was removed under vacuum with a constant flow of air bubbling through the product.
Analysis: GPC: Mw 6440, Mn 2763

Example 16

100 g of D.E.R™ 732P ex Dow (0.156 moles) and 19.8 g of D.E.R™ 736P ex Dow (0.052 moles) were added to the reaction vessel, equipped with a stirrer and a temperature probe and heated to 60° C. A solution of 26.87 g of piperazine (0.312 moles) in 60 g of water was then added. The mixture was held at 60° C. for 2 hours. The contents of the reaction vessel were then cooled to room temperature. The product is a viscous light yellow liquid.
Analysis: GPC: Mw 5428, Mn 1960

Example 17

98.68 g of SR 494 ex Sartomer (0.187 moles) and 0.15 g of BHT (0.0007 moles) were mixed in a reaction vessel equipped with a stirrer, air inlet, condenser and a temperature probe. 51.32 g (0.0267 moles) of the product obtained in example 16 were then added slowly. The mixture was then heated to 60° C. and held at this temperature for 2 hours. The content of the reactor vessel were then cooled to room temperature and transferred to a rotary evaporator flask. Water was removed under vacuum with a constant flow of air bubbling through the product. The product is a viscous light yellow liquid.
Analysis: GPC: Mw 7380, Mn 3032

Example 18

100 g of D.E.R™ 732P ex Dow (0.156 moles), 8.72 g of bisphenol A diglycidyl ether (D.E.R™ 661 ex Dow) (0.0082 moles) were mixed in a reaction vessel equipped with a stirrer, condenser and a temperature probe and heated to 70° C. A solution of 21.22 g of piperazine (0.247 moles) in 50 g of water was then added. The mixture was held at 60° C. for 2 hours. The contents of the reaction vessel were then cooled to room temperature. The product is a highly viscous slight yellow liquid.
Analysis: GPC: Mw 6883, Mn 1565

Example 19

106.10 g of SR 494 ex Sartomer (0.200 moles) and 0.15 g of BHT (0.0007 moles) were mixed in a reaction vessel equipped with a stirrer, air inlet, condenser and a temperature probe. 43.90 g (0.02 moles) of the product obtained in Example 18 was then added slowly. The mixture was then heated to 60° C. and held at this temperature for 2 hours. The contents of the reaction vessel were then cooled to room temperature and transferred to a rotary evaporator flask. Water was removed under vacuum with a constant flow of air bubbling through the product. The product is a viscous slight yellow liquid.
Analysis: GPC: Mw 7901, Mn 2911

Example 20

100 g of D.E.R™ 732 ex Dow (0.156 moles), 18.40 g of D.E.R™ 661 ex Dow (0.0173 moles) and 17.92 g of piperazine (0.208 moles) were mixed in a reaction vessel equipped with a stirrer, condenser and a temperature probe. The mixture is then heated to 40° C. to 50° C. for 3 hours, the temperature was then raised to 70° C. to 80° C. and held at this temperature for 2 hours. The contents of the reaction vessel were then cooled to room temperature. The product is a highly viscous yellow liquid.
Analysis: GPC: Mw 7740, Mn 1520

Example 21

67.00 g of SR 494 ex Sartomer (0.132 moles) and 0.15 g of BHT (0.0007 moles) were mixed in a reaction vessel equipped with a stirrer, air inlet, condenser and a temperature probe. 76.29 g (0.0194 moles) of the product obtained in Example 20 were then added slowly. The mixture was then heated to 60° C. and held at this temperature for 2 hours. The contents of the reaction vessel were then cooled to room temperature. The product is a viscous yellow liquid.
Analysis: GPC: Mw 8030, Mn 1270

Example 22

100 g of D.E.R™ 732 ex Dow (0.156 moles), 19.48 g of D.E.R™ 331 ex Dow (0.052 moles) were mixed in a reaction vessel equipped with a stirrer, condenser and a temperature probe and heated to 60° C. A solution of 26.28 g of piperazine (0.306 moles) in 30 g of water was then added. The mixture was then held at 60° C. for 2 hours. The contents of the reaction vessel were then cooled to room temperature. The product is a highly viscous yellow liquid. Note: D.E.R™ 331 is a bisphenol A diglycidyl ether having a lower molecular weight than D.E.R™ 661.

Example 23

101.81 g of SR 494 ex Sartomer (0.193 moles) and 0.15 g BHT (0.0007 moles) were mixed in a reaction vessel equipped with a stirrer, air inlet, condenser and a temperature probe. 48.19 g (0.027 moles) of the product obtained in example 22 were then added slowly. The mixture was then heated to 60° C. and held at this temperature for 2 hours. The contents of the reaction vessel were then cooled to room temperature and transferred to a rotary evaporator flask. Water was removed under vacuum with a constant flow of air bubbling through the product. The product is a viscous yellow liquid.
Analysis: GPC: Mw 5524, Mn 2729

Example 24

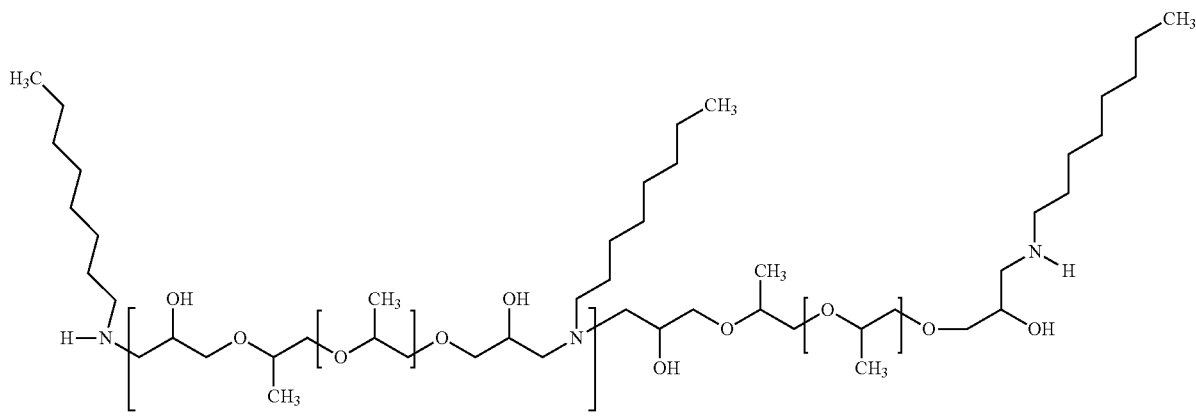

100 g of D.E.R™ 732 ex Dow (0.156 moles) were added to the reaction vessel, equipped with a stirrer, condenser and a temperature probe and heated to 60° C. 24.23 g of octylamine (0.187 moles) were added. The mixture was held at 70° C. for 3 hours. The contents of the reaction vessel were then cooled to room temperature. The product was obtained in good yield. The product is a viscous slight yellow liquid.

Analysis: GPC: Mw 5555, Mn 2226; IR: OH str at 3448 $cm^{-1}$, epoxide CO str at 1254 $\mu m^{-1}$ no longer present, primary amine no longer present

Example 25

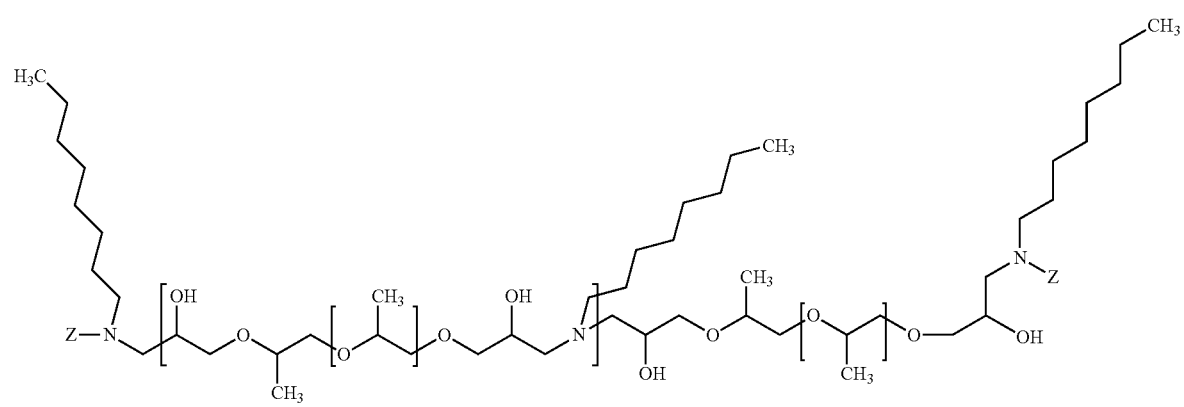

$Z =$ 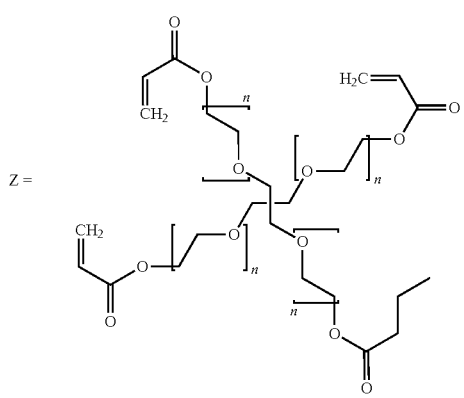

52.04 g of SR 494 ex Sartomer (0.098 moles) and 0.15 g of BHT (0.0007 moles) were mixed in a reaction vessel equipped with a stirrer, air inlet, condenser and a temperature probe. 97.96 g (0.0246 moles) of the product obtained in example 24 were then added slowly. The mixture was then heated to 60° C. and held at this temperature for 2 hours.

The contents of the reaction vessel were then cooled to room temperature. The product is a viscous slight yellow liquid.

Analysis: GPC: Mw 7022, Mn 3858; IR: Secondary amine no longer present

Example 26 tion vessel equipped with a stirrer, air inlet, condenser and a temperature probe. 90.34 g (0.0227 moles) of the product obtained in example 24 was then added slowly. The mixture was then heated to 60° C. and held at this temperature for 2 hours. The contents of the reaction vessel were then cooled to room temperature. The product is a viscous slight yellow liquid.

Analysis: GPC: Mw 7645, Mn 2280

Example 27

100 g of D.E.R™ 732 (Mw: 640) (0.156 moles) and 8.33 g of CARDURA™ Glycidyl Ester E10P ex Hexion Speciality Chemicals B.V. (0.0347 moles) were added to the reaction

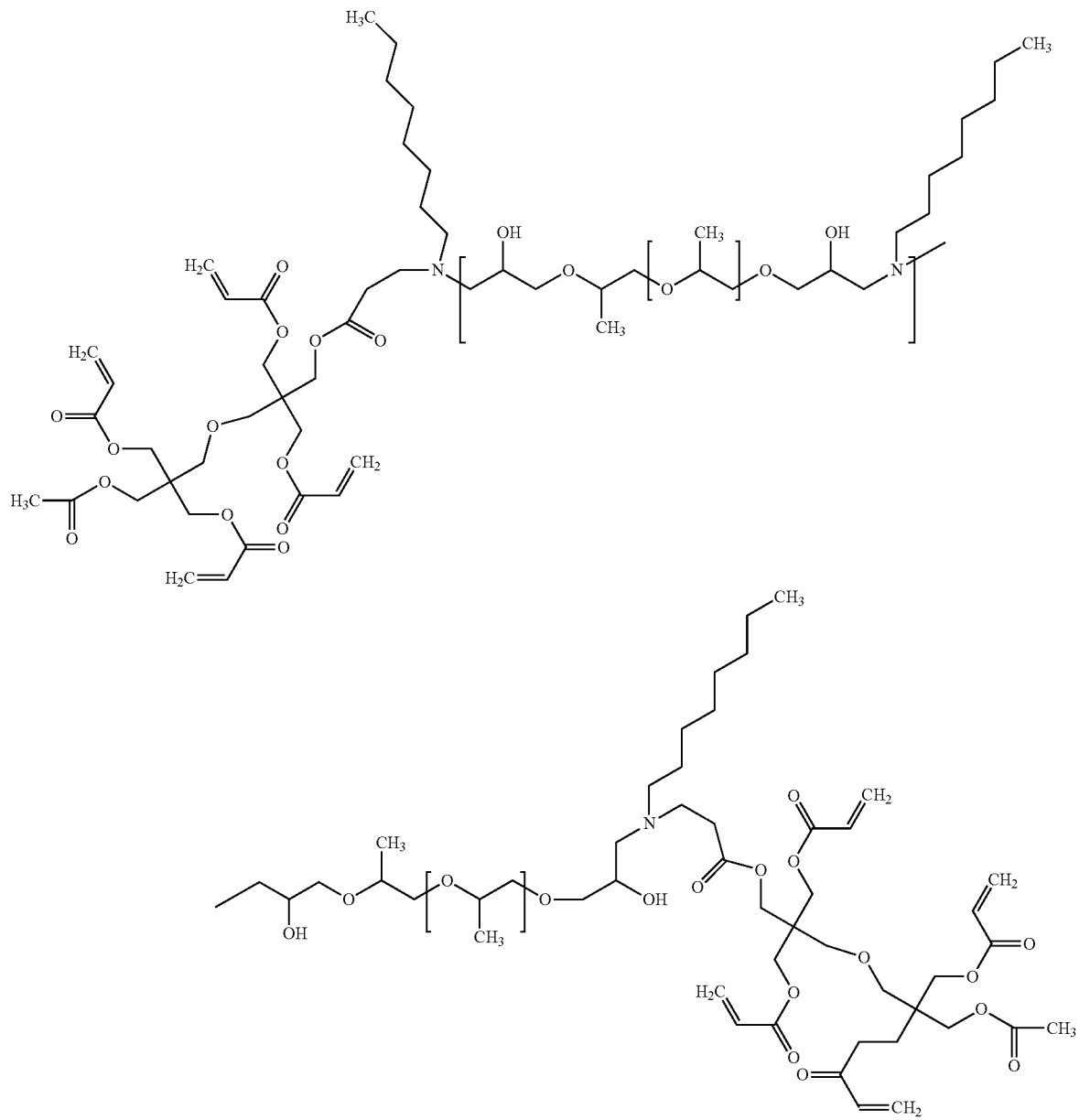

62.10 g of Dipentaerythritol penta-/hexa acrylate (SR 399 ex Sartomer) (0.118 moles) and 0.15 g of 2, 6 di-tert-butyl-4-methylphenol (BHT) (0.0007 moles) were mixed in a reacvessel, equipped with a stirrer, condenser and a temperature probe and heated to 60° C. 26.92 g of octylamine (0.208 moles) were then added. The mixture was held at 60° C.-70°

C. for 9 hours, the temperature was then raised to 80° C. and held for 5 hours. The contents of the reaction vessel were then cooled to room temperature. The product is a viscous slight yellow liquid. Note: A monofunctional diglycidyl ether is used to produce a lower molecular weight product than that of Example 24.

Analysis: GPC: Mw 4399, Mn 1890

Example 28

51.87 g of SR 494 ex Sartomer (0.098 moles) and 0.15 g of BHT (0.0007 moles) were mixed in a reaction vessel equipped with a stirrer, air inlet, condenser and a temperature probe. 98.13 g (0.0245 moles) of the product obtained in example 27 was then added slowly. The mixture was then heated to 60° C. and held at this temperature for 2 hours. The contents of the reaction vessel were then cooled to room temperature. The product is a viscous slight yellow liquid.

Analysis: GPC: Mw 6188, Mn 3443

Example 29

100 g of D.E.R™ 732 ex Dow (0.156 moles), 21.72 g of dodecylamine (0.117 moles) and 10.078 g piperazine (0.117 moles) were added to the reaction vessel, equipped with a stirrer, condenser and a temperature probe and heated to 40° C. for 6 hours. The contents of the reaction vessel were then cooled to room temperature. The product is a viscous slight yellow liquid.

Example 30

91.52 g of SR 494 ex Sartomer (0.173 moles) and 0.15 g of BHT (0.0007 moles) were mixed in a reaction vessel equipped with a stirrer, air inlet, condenser and a temperature probe. 58.48 g (0.0347 moles) of the product obtained in example 30 was then added slowly. The mixture was then heated to 60° C. and held at this temperature for 2 hours. The contents of the reaction vessel were then cooled to room temperature. The product is a viscous slight yellow liquid.

Analysis: GPC: Mw, Mn

Example 31

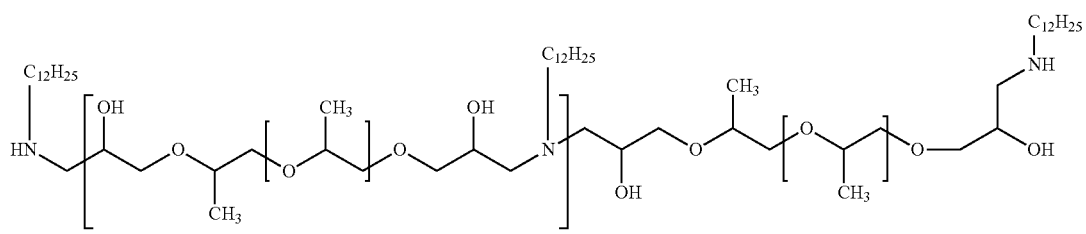

100 g of D.E.R™ 732 ex Dow (0.156 moles) and 34.75 g of dodecylamine (0.187 moles) were added to the reaction vessel, equipped with a stirrer, condenser and a temperature probe and heated to 40° C. for 5½ hours, then the temperature was increased to 70° C. and held at this temperature for 3 hours. The contents of the reaction vessel were then cooled to room temperature. The product is a viscous slight yellow liquid.

Analysis: GPC: Mw 6211, Mn 2505

Example 32

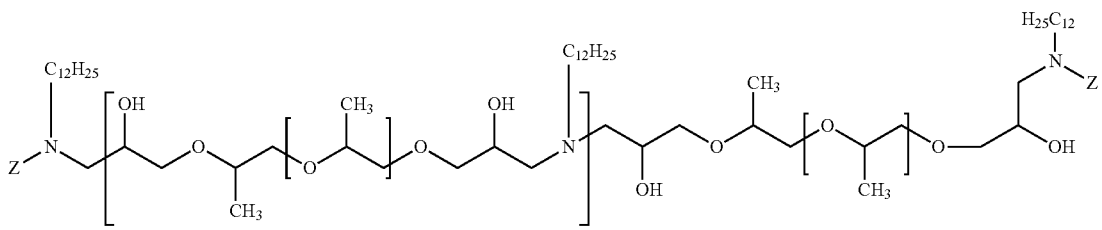

-continued

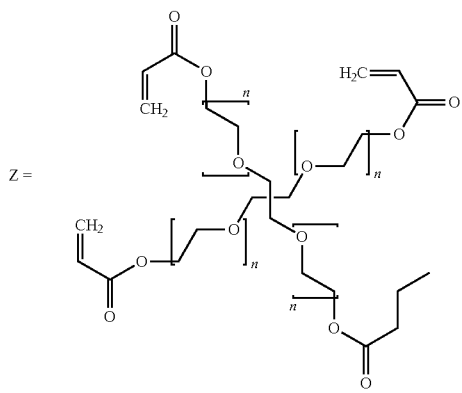

Z =

49.31 g of SR 494 ex Sartomer (0.093 moles) and 0.15 g of BHT (0.0007 moles) were mixed in a reaction vessel equipped with a stirrer, air inlet, condenser and a temperature probe. 100.69 g (0.0233 moles) of the product obtained in example 31 was then added slowly. The mixture was then heated to 60° C. and held at this temperature for 2 hours.

The contents of the reaction vessel were then cooled to room temperature. The product is a viscous slight yellow liquid.

Analysis: GPC: Mw 7070, Mn 3978

Example 33

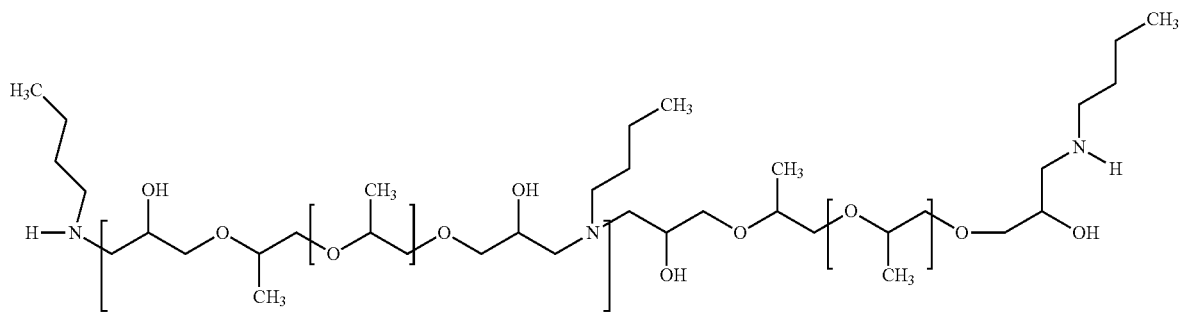

100 g of D.E.R™ 732 ex Dow (0.156 moles) and 13.71 g of butylamine (0.187 moles) were added to the reaction vessel, equipped with a stirrer, condenser and a temperature probe and heated to 60-70° C. for 6 hours. The contents of the reaction vessel were then cooled to room temperature. The product is a viscous slight yellow liquid.

Analysis: GPC: Mw 6179, Mn 2399

Example 34

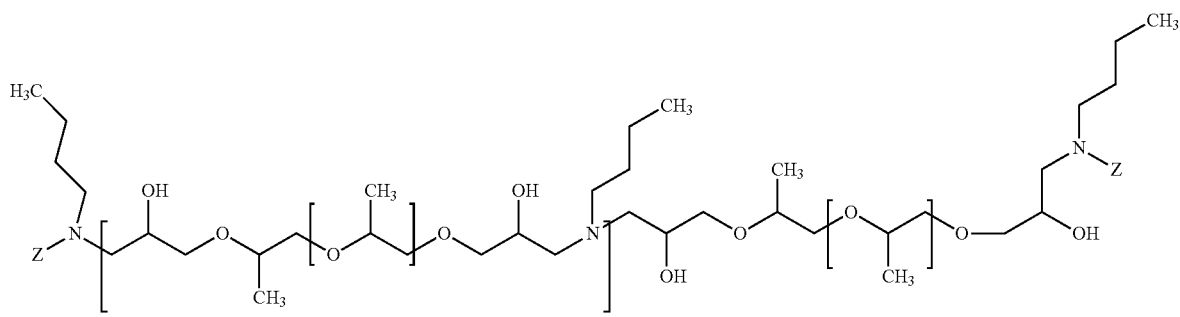

Z = 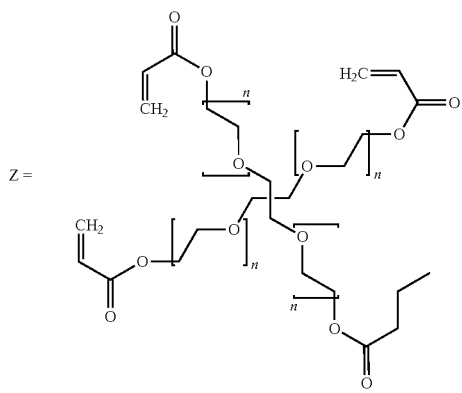

55.03 g of SR 494 ex Sartomer (0.104 moles) and 0.15 g of BHT (0.0007 moles) were mixed in a reaction vessel equipped with a stirrer, air inlet, condenser and a temperature probe. 94.97 g (0.026 moles) of the product obtained in example 33 was then added slowly. The mixture was then heated to 60° C. and held at this temperature for 2 hours. The contents of the reaction vessel were then cooled to room temperature. The product is a viscous slight yellow liquid.
Analysis: GPC: Mw 6508, Mn 3576

Example 35

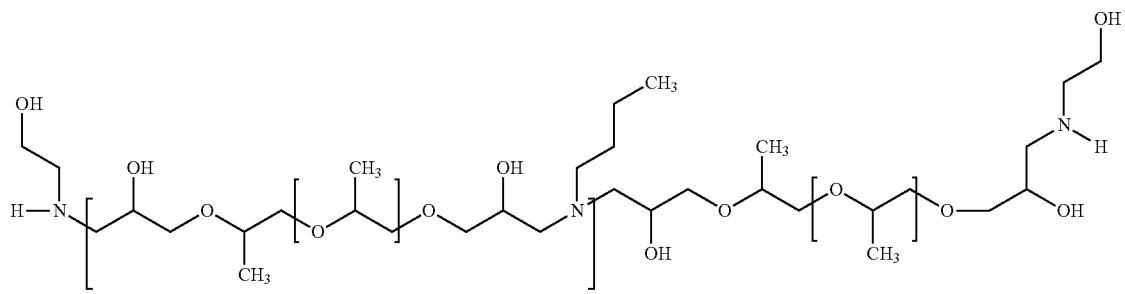

300 g of D.E.R™ 732 ex Dow (0.469 moles) were added to the reaction vessel, equipped with a stirrer, condenser and a temperature probe and heated to 60° C. 34.35 g of ethanolamine (0.562 moles) were added. The mixture was held at 60° C. for 3 hours. The contents of the reaction vessel were then cooled to room temperature. The product is a viscous yellow liquid.
Analysis: GPC: Mw 4282, Mn 1887

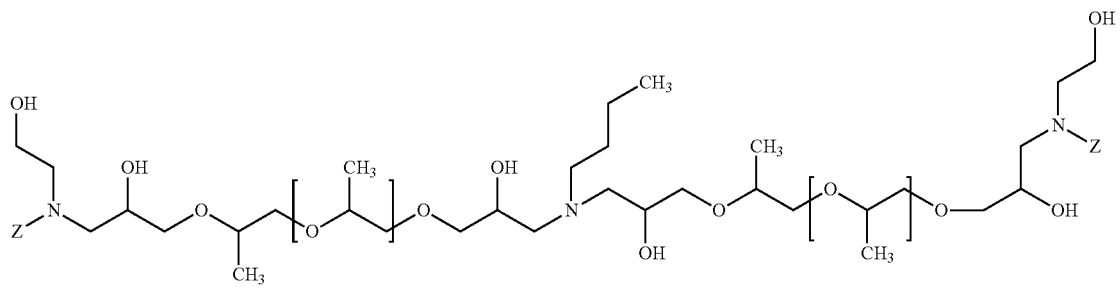

Z = 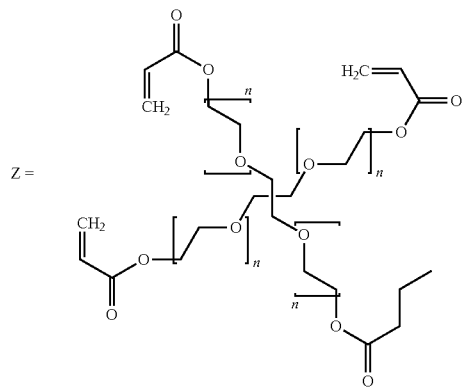

148.61 g SR 494 ex Sartomer (0.281 moles) and BHT (0.0018 moles) were mixed in a reaction vessel equipped with a stirrer, air inlet, condenser and a temperature probe. 251.39 g (0.07 moles) of the product obtained in example 35 was then added slowly. The mixture was then heated to 60° C. and held at this temperature for 2 hours. The contents of the reaction vessel were then cooled to room temperature. The product is a viscous dark yellow liquid.

Analysis: GPC: Mw 6806, Mn 3801

Example 37

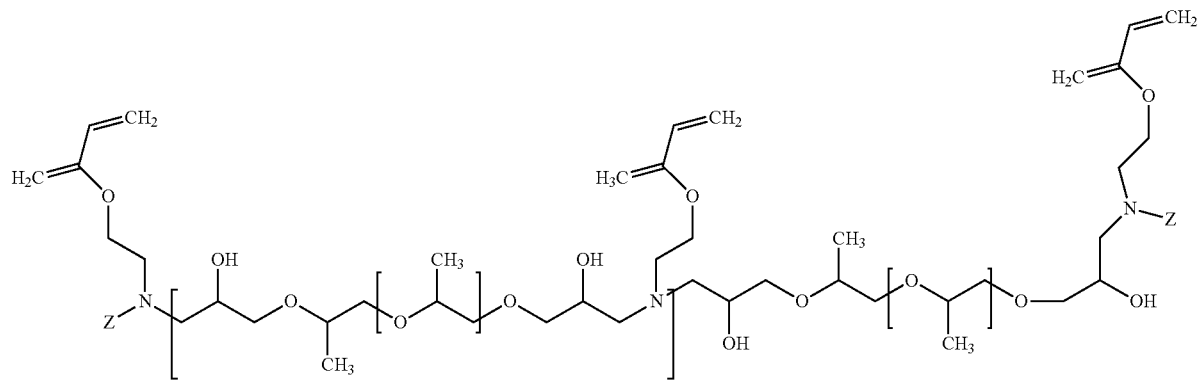

Z = 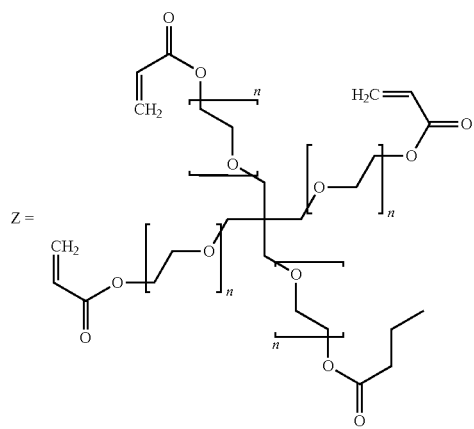

100 g of the product obtained in example 36, 8 g of triethylamine and 50 g of methyl ethyl ketone (MEK) were added to the reaction vessel equipped with a stirrer, air inlet, condenser and a temperature probe and cooled down to 9° C.-10° C. Then 7.2 g of acryloyl chloride (0.0795 moles) were added slowly to the mixture keeping the temperature no higher than 13° C. Once the addition was finished, the mixture was held for 2 hours at room temperature and then filtered to remove the insoluble triethylamine hydrochloride formed during the reaction. The methyl ethyl ketone was then removed on a rotary evaporator. The product is a viscous dark yellow liquid.

Analysis: GPC: Mw 7748, Mn 4014

Example 38

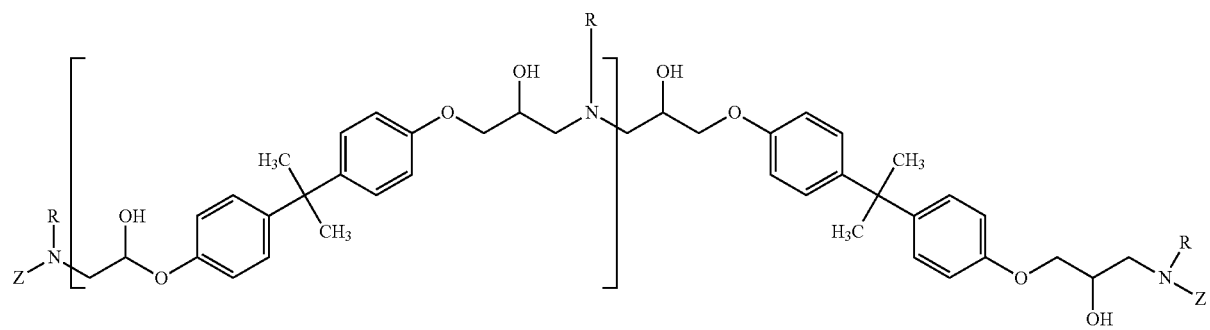

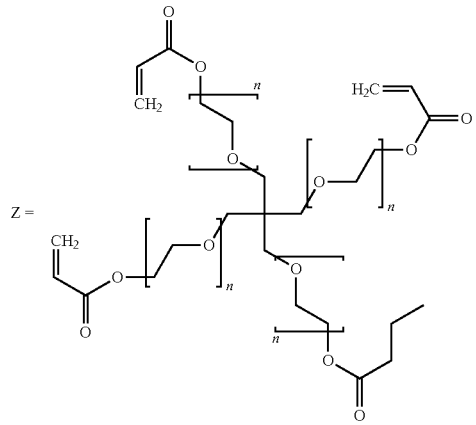

R = mixture of butyl and dodecyl groups

Note: The simplified structure illustrated above does not reflect the oligomeric nature of the bisphenol A diglycidyl ether.

100 g of D.E.R™ 331 ex Dow (0.267 moles), 17.52 g of butylamine (0.239 moles) and 15.15 g (0.082) were added to the reaction vessel, equipped with a stirrer, condenser and a temperature probe and heated to 30° C.-40° C. for 2 hours and then increased to 90° C.-100° C. for 1 hour. 113 g of PPTTA (0.214 moles) were then added, the mixture was held at around 80° C. for 2 hours. The contents of the reaction vessel were then cooled to room temperature. The product is a high viscous opaque white liquid resin.

Example 39

100 g of polyethylene glycol diglycidyl ether (Mw: 640) (D.E.R 732P ex Dow) (0.1562 moles), 15.6 g of 1,6-hexanediol diglycidyl ether (0.052 moles) and 21.5 g of piperazine (0.2499 moles) were mixed in a reaction vessel equipped with a stirrer, a condenser and a temperature probe. The mixture was held at 30° C. for 7 hours and then heated to 60° C. for 2 hours. The contents of the reaction vessel were then cooled to room temperature. The product is a viscous liquid.

Example 40

58.62 g of ethoxylated pentaerythritol tetraacrylate (SR 494 ex Sartomer) (0.1111 moles) and 0.15 g of 2,6 di-tert-butyl-4-methylphenol (BHT) (0.0007 moles) were mixed in a reaction vessel equipped with a stirrer, condenser and a temperature probe. 91.38 g (0.0278 moles) of the product obtained in Example 39 were added into the mixture and heated to 60° C. for 2 hours. The contents of the reaction vessel were then cooled to room temperature. The product is a viscous light yellow liquid.

Example 41

100 g of D.E.R 732P (0.1562 moles), 18.2 g cyclohexane dimethanol diglycidyl of 1,6-hexanediol diglycidyl ether (0.052 moles) and 21.5 g of piperazine (0.2499 moles) were mixed in a reaction vessel equipped with a stirrer, a condenser and a temperature probe. The mixture was held at 30° C. for 7 hours and then heated to 60° C. for 2 hours. The contents of the reaction vessel were then cooled to room temperature. The product is a viscous liquid Example 42

57.96 g of SR 494 ex Sartomer (0.1098 moles) and 0.15 g of BHT (0.0007 moles) were mixed in a reaction vessel equipped with a stirrer, condenser and a temperature probe. 92.64 g (0.0276 moles) of the product obtained in Example 41 were added into the mixture and heated to 60° C. for 2 hours. The contents of the reaction vessel were then cooled to room temperature.

Example 43

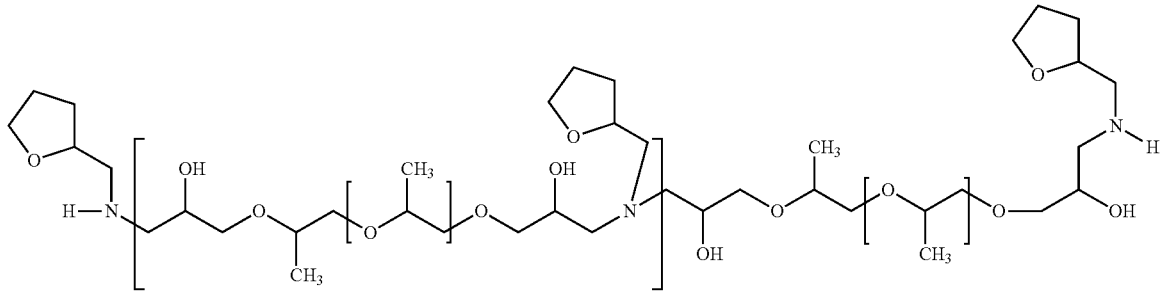

100 g of polypropylene glycol diglycidyl ether D.E.R™ 732 ex Dow (Mw: 640) (0.1562 moles) and 18.96 g of tetrahydrofurfurylamine (0.1874 moles) were mixed in a reaction vessel equipped with a stirrer, a condenser and a temperature probe. The mixture was held at 60° C. for 7 hours. The contents of the reaction vessel were then cooled to room temperature.

Analysis: GPC: Mw 5030, Mn 1400

Example 44

53.5 g of SR 494 ex Sartomer (0.1013 moles) and 0.15 g of BHT (0.0007 moles) were mixed in a reaction vessel equipped with a stirrer, condenser and a temperature probe. 96.48 g (0.0253 moles) of the product obtained in Example 43 were added into the mixture and heated to 60° C. for 2 hours. The contents of the reaction vessel were then cooled to room temperature.

Example 45

100 g of polypropylene glycol diglycidyl ether D.E.R™ 736 ex Dow (Mw: 380) (0.2631 moles) and 31.97 g of tetrahydrofurfurylamine (0.3157 moles) were mixed in a reaction vessel equipped with a stirrer, a condenser and a temperature probe. The mixture was held at 70° C. for 5 hours. The contents of the reaction vessel were then cooled to room temperature.

Analysis: GPC: Mw 2770, Mn 900

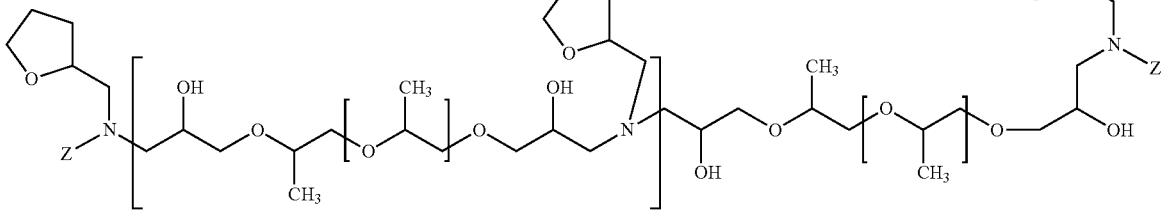

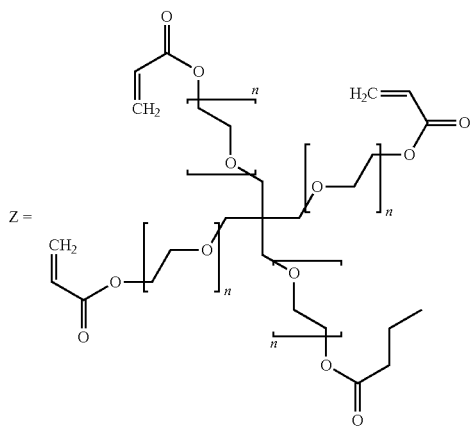

Example 46

68.57 g of SR 494 ex Sartomer (0.1299 moles) and 0.15 g BHT (0.0007 moles) were mixed in a reaction vessel equipped with a stirrer, condenser and a temperature probe. 81.43 g (0.0325 moles) of the product obtained in Example 45 were added into the mixture and heated to 60° C. for 2 hours. The contents of the reaction vessel were then cooled to room temperature.

Example 47

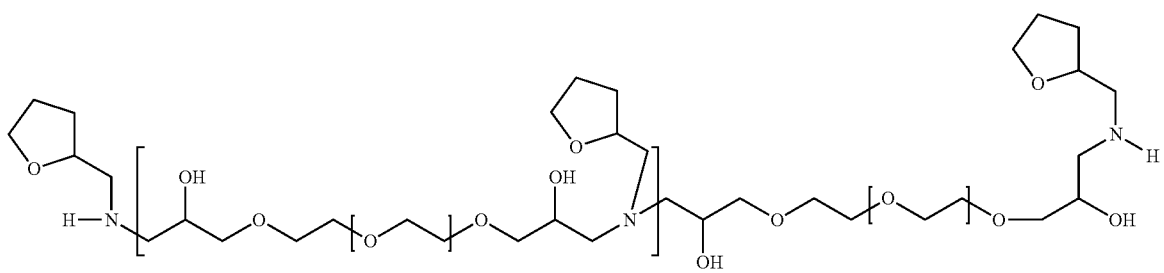

125 g of DEG 400 PE (0.2376 moles) and 27.41 g of tetrahydrofurfurylamine (0.2707 moles) were mixed in a reaction vessel equipped with a stirrer, a condenser and a temperature probe. The mixture was held at 70° for 7 hours. The contents of the reaction vessel were then cooled to room temperature.

Analysis: GPC: Mw 2540, Mn 920

Example 48

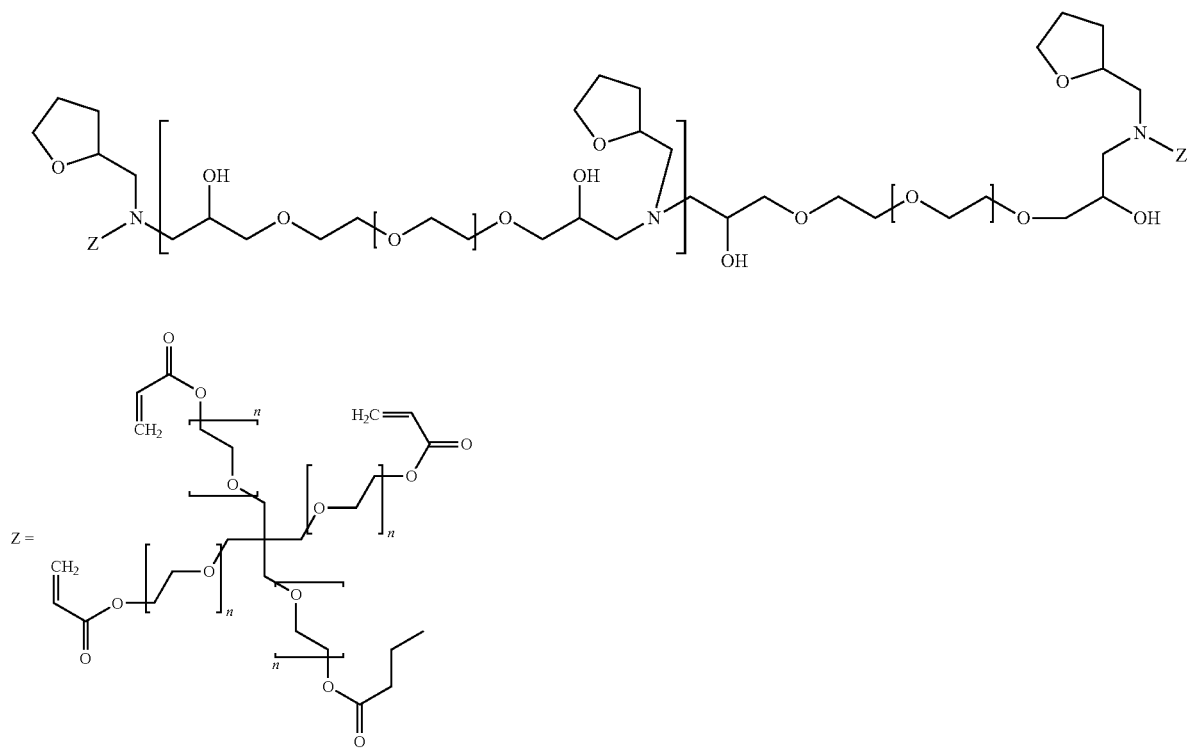

57.61 g (0.1091 moles) of SR494 ex Sartomer and 0.15 g of BHT (0.0007 moles) were mixed in a reaction vessel equipped with a stirrer, condenser and a temperature probe. 92.39 g (0.0273 moles) of the product obtained in Example 47 were added into the mixture and heated at 60° C. for 2 hours. The contents of the reaction vessel were cooled to room temperature.

Example 49

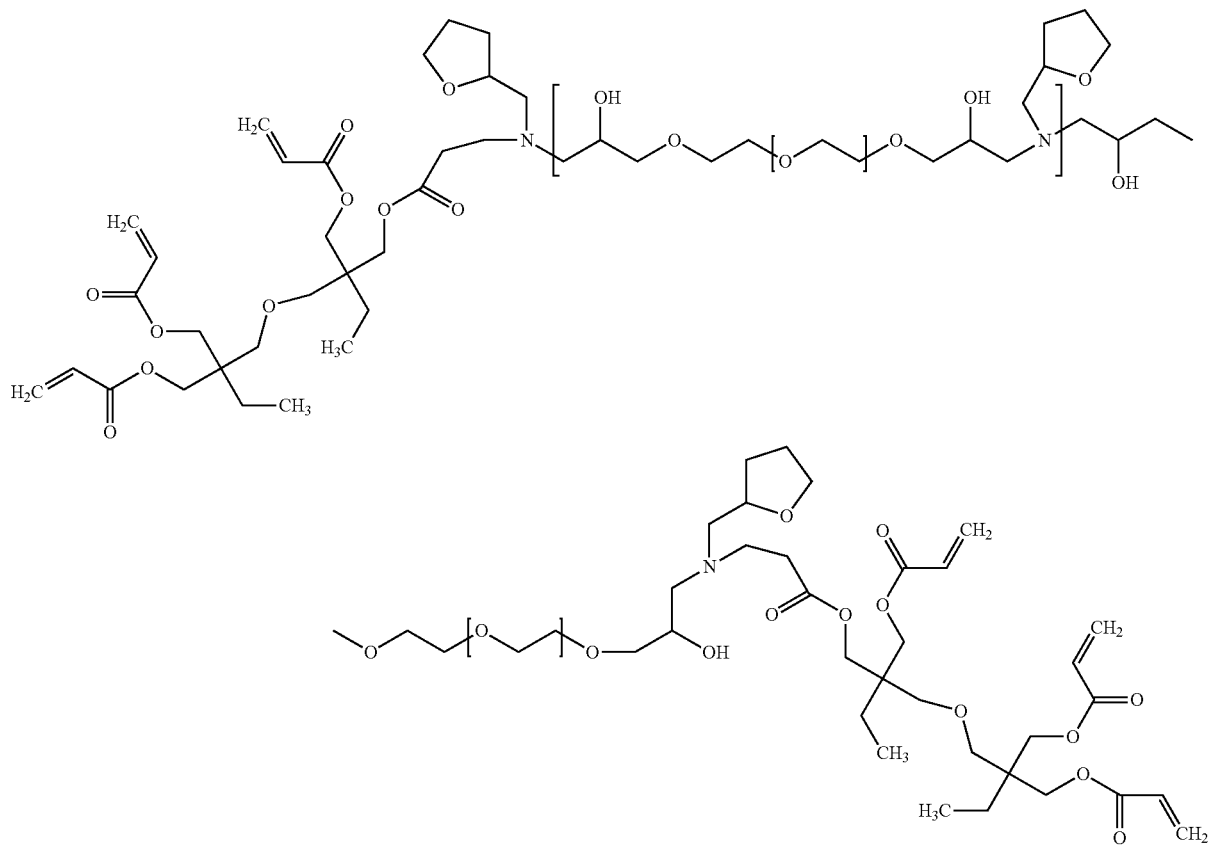

27.52 g of Di-TMPTA (0.059 moles) and 0.0077 g of BHT (0.00004 moles) were added to the reaction vessel equipped with a stirrer, a condenser and a temperature probe and mixed. 50 g (0.0148 moles) of the product obtained in Example 47 were added into the mixture and heated at 60° C. for 2 hours. The contents of the reaction vessel were cooled to room temperature.

Example 50

61.92 g of D.E.R™ 736P (0.163 moles) and 8.7 g of the monoglycidyl ether CARDURA™ Glycidyl Ester E10P ex Hexion Speciality Chemicals B.V. (0.03625 moles) and 22 g of tetrahydrofurfurylamine (0.2173 moles) were mixed in a reaction vessel equipped with a stirrer, a condenser and a temperature probe. The mixture was held at 70° C. for 5 hours. The contents of the reaction vessel were then cooled to room temperature.

Analysis: GPC: Mw 2100, Mn 780

Example 51

57.96 g of SR 494 ex Sartomer (0.1098 moles) and 0.15 g of BHT (0.0007 moles) were mixed in a reaction vessel equipped with a stirrer, condenser and a temperature probe. 92.64 g (0.0359 moles) of the product obtained in Example 50 were added into the mixture and heated to 60° C. for 2 hours. The contents of the reaction vessel were then cooled to room temperature.

Example 52

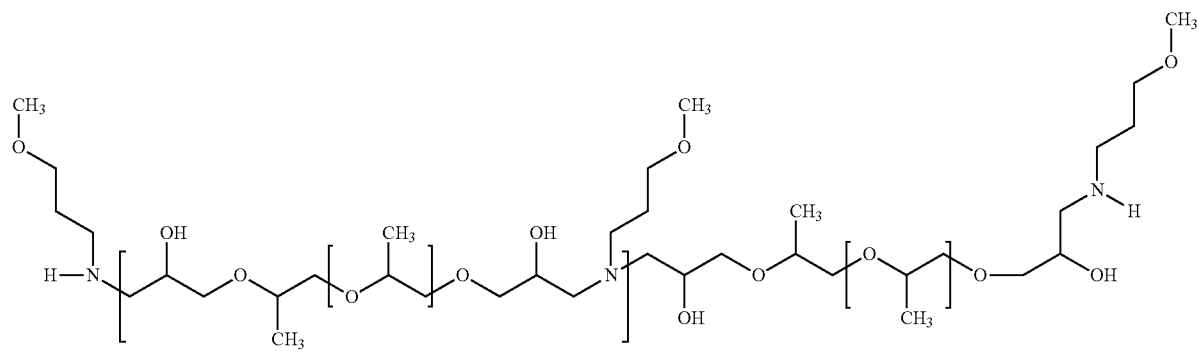

150 g of DER 732R (0.2343 moles) and 150 g of 3-methoxy propylamine were mixed in a reaction vessel equipped with a stirrer, a condenser and a temperature probe. The mixture was held at 70° C. for 4½ hours and for 2 further hours at 80° C. The contents of the reaction vessel were then cooled to room temperature.

Analysis: GPC: Mw 4190, Mn 1190

Example 53

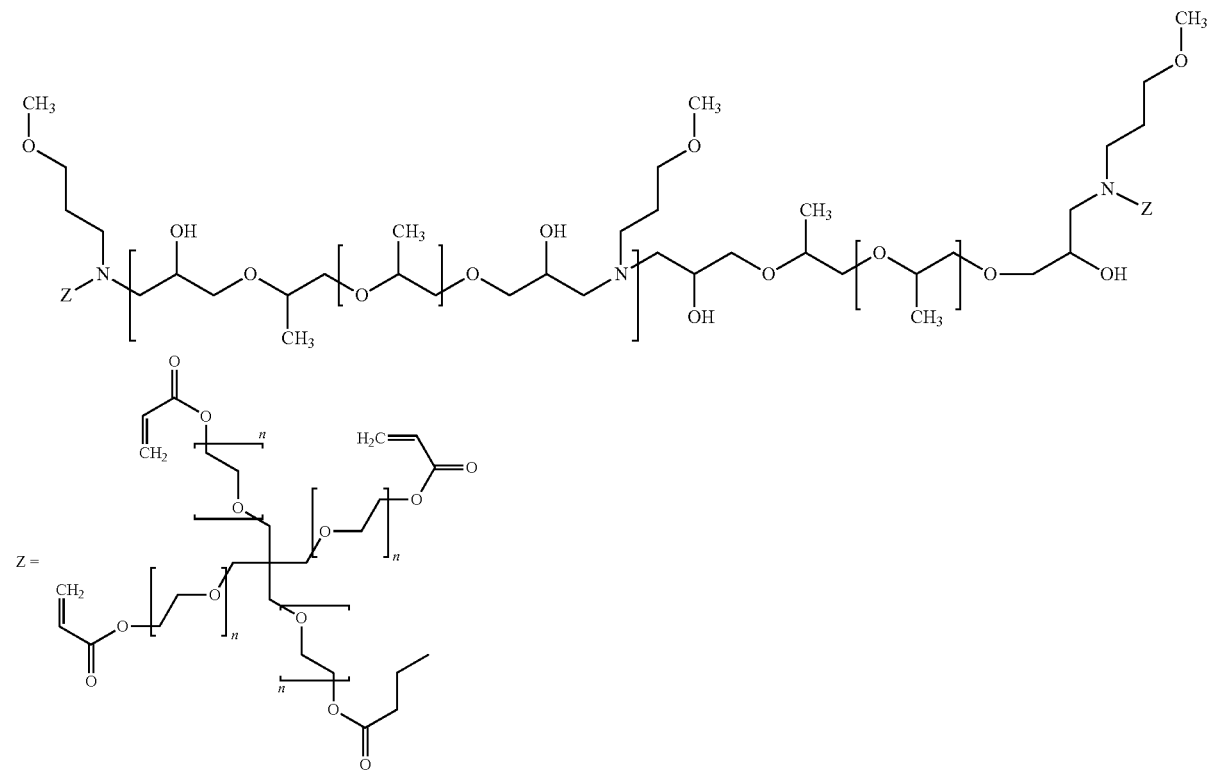

54.19 g of SR 494 ex Sartomer (0.1026 moles) and 0.15 g of BHT (0.0007 moles) were mixed in a reaction vessel equipped with a stirrer, condenser and a temperature probe. 95.81 g (0.0257 moles) of the product obtained in Example 52 were added into the mixture and heated to 60° C. for 2 hours. The contents of the reaction vessel were then cooled to room temperature.

Example 54

200 g of D.E.R™ 732P (0.3125 moles) and 37.93 g of tetrahydrofurfurylamine (0.375 moles) were mixed in a reaction vessel equipped with a stirrer, a condenser and a temperature probe. The mixture was held at 70° C. for 6 hours. The contents of the reaction vessel were then cooled to room temperature to provide similar product to that obtained in Example 45.

Example 55

49.30 g of Di-TMPTA (0.1485 moles) and 0.15 g of BHT (0.0007 moles) were added to the reaction vessel equipped with a stirrer, a condenser and a temperature probe and mixed. 100.69 g (0.0264 moles) of the product obtained in Example 54 were added into the mixture and heated at 60° C. for 2 hours. The contents of the reaction vessel were cooled to room temperature.

Example 56

69.21 g of Di-TMPTA (0.1485 moles) and 0.15 g of BHT (0.0007 moles) were added to the reaction vessel equipped with a stirrer, a condenser and a temperature probe and mixed. 80.79 g (0.0212 moles) of the product obtained in Example 54 were added into the mixture and heated at 60° C. for 2 hours. The contents of the reaction vessel were cooled to room temperature.

Example 57

200 g of DER 732 (0.3125 moles) and 18.96 g of tetrahydrofurfurylamine (0.1874 moles) were mixed in a reaction vessel equipped with a stirrer, a condenser and a temperature probe. The mixture was held at 70° C. for 2½ hours, the mixture was cooled to 30° C. and 16.12 g of piperazine (0.1874 moles) were then added and held at 30° C. for 9 hours. The contents of the reaction vessel were then cooled to room temperature.

Example 58

53.94 g of SR 494 ex Sartomer (0.1021 moles) and 0.15 g of BHT (0.0007 moles) were mixed in a reaction vessel equipped with a stirrer, condenser and a temperature probe. 96.06 g (0.0255 moles) of the product obtained in Example 57 were added into the mixture and heated to 60° C. for 2 hours. The contents of the reaction vessel were then cooled to room temperature.

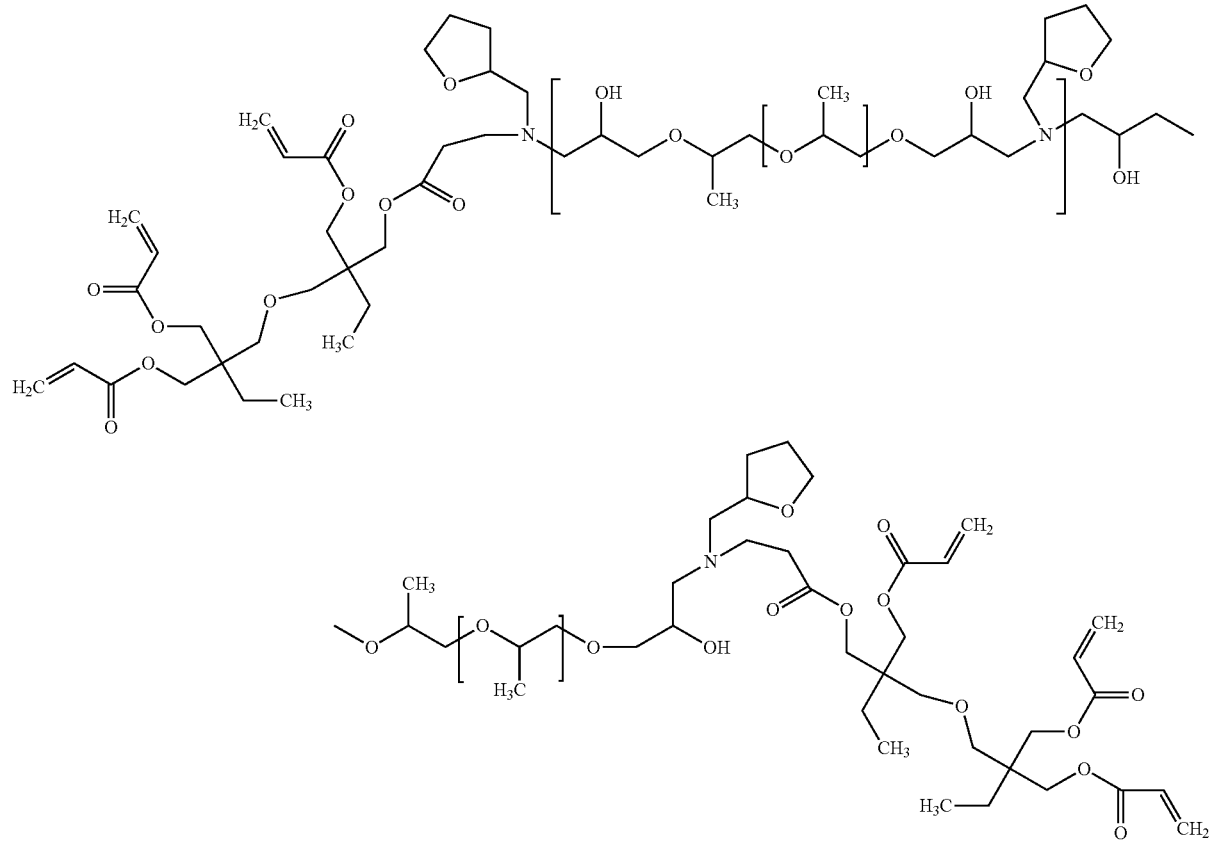

Example 59

60.75 g of glycerol propoxylated triacrylate (OTA 480 ex Cytec) (0.1265 moles) and 0.15 g of BHT (0.0007 moles) were mixed in a reaction vessel equipped with a stirrer, condenser and a temperature probe. 89.25 g (0.055 moles) of the product obtained in Example 57 were added into the mixture and heated to 60° C. for 2 hours. The contents of the reaction vessel were then cooled down.

Example 60

100 g of DER 732P ex Dow (0.1562 moles) and 25.3 g of octadecylamine (0.0939 moles) were mixed in a reaction vessel equipped with a stirrer, a condenser and a temperature probe. The mixture was held at 40° C.-50° C. for an hour, 70° C. for 3 hours, 85° C. for 8½ hours. The mixture was then cooled to 30° C. and 8.1 g of piperazine were added (0.0094 moles) and held at 30° C. for 2 hours and at 60° C. for 2 hours. The contents of the reaction vessel were then cooled down.

Example 61

49.64 g of SR 494 ex Sartomer (0.094 moles) and 0.15 g of BHT (0.0007 moles) were mixed in a reaction vessel equipped with a stirrer, condenser and a temperature probe. 100.36 g (0.0235 moles) of the product obtained in Example 60 were added into the mixture and heated to 60° C. for 2 hours. The contents of the reaction vessel were then cooled to room temperature Example 62

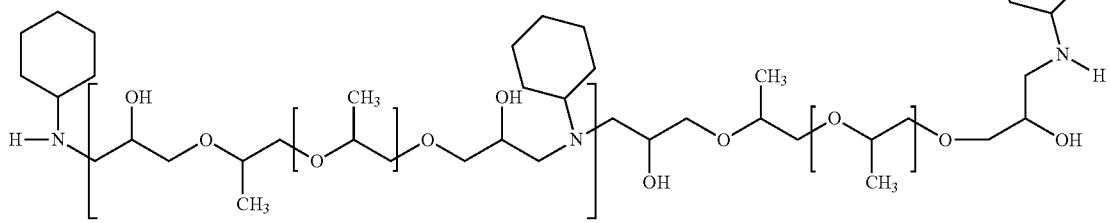

100 g of DER 732P (0.1562 moles) and 18.57 g of cyclohexylamine (0.1872 moles) were mixed in a reaction vessel equipped with a stirrer, a condenser and a temperature probe. The mixture was held at 60° C. for 6 hours. The contents of the reaction were then cooled down to room temperature.

Example 61

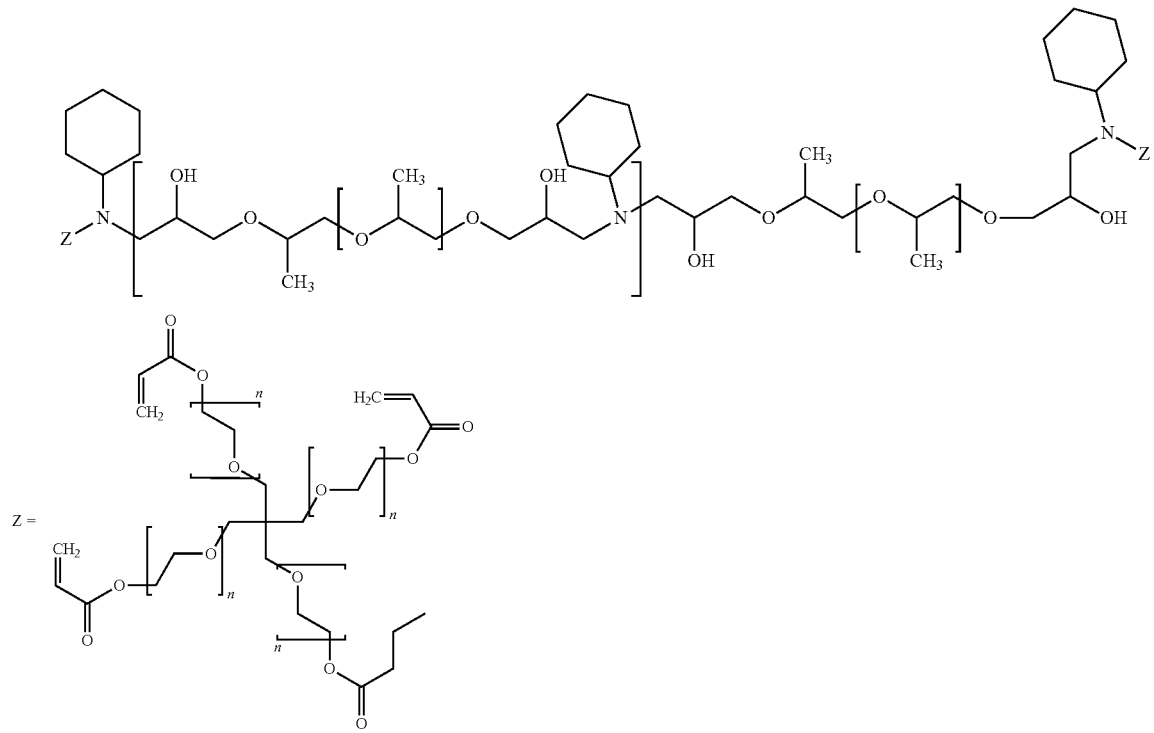

47.32 g of SR 494 ex Sartomer (0.0896 moles) and 0.13 g of BHT (0.0006 moles) were mixed in a reaction vessel equipped with a stirrer, condenser and a temperature probe. 85 g (0.0224 moles) of the product obtained in Example 62 were added into the mixture and heated to 60° C. for 2 hours. The contents of the reaction vessel were then cooled to room temperature.

Example 64

100 g of D.E.R™ 732P ex Dow (0.1562 moles), 59.37 g of D.E.R™ 736P ex Dow (0.1562 moles) and 27.43 g of butylamine (0.375 moles) were mixed in a reaction vessel equipped with a stirrer, a condenser and a temperature probe. The mixture was held at 60° C. for 1 hour, 70° C. for 3 hours and 90° C. for 13½ hours. The contents of the reaction were then cooled down to room temperature.

Example 65

62.11 g of SR494 ex Sartomer (0.1176 moles), 0.15 g of BHT (0.0007 moles) were mixed in a reaction vessel equipped with a stirrer and air blowing through it. 87.89 g (0.0294 moles) of the product obtained in Example 64 were added into the mixture and heated at 90° C. for 4 hours and 100° C. for 6½ hours. The contents of the reaction vessel were then cooled to room temperature.

Example 66

100 g of DER 732P ex Dow (0.1562 moles), 59.37 g of DER ex Dow (0.1562 moles), 15.18 g of dipropylamine (0.15 moles) and 17.73 g of propylamine (0.3 moles) were mixed in a reaction vessel equipped with a stirrer, a condenser and a temperature probe. The mixture was held at 30° C. for 6 hours, 70° C. for 6½ hours and 90° C. for 6 hours. The contents of the reaction vessel were the cooled to room temperature.

Example 67

61.05 g of SR494 ex Sartomer (0.1156 moles), 0.15 g of BHT (0.0007 moles) were mixed in a reaction vessel equipped with a stirrer and air blowing through it. 88.95 g (0.0289 moles) of the product obtained in Example 66 were added into the mixture and heated at 60° C. for 5 hours and 90° C. for 6 hours. The contents of the reaction vessel were then cooled to room temperature.

Example 68

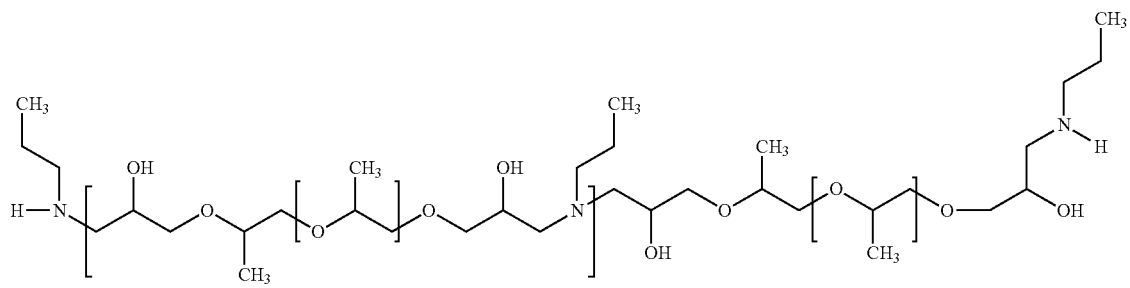

100 g of DER 732P ex Dow (0.1562 moles), 59.37 g of DER 736P ex Dow (0.1562 moles) and 22.17 g of propylamine (0.375 moles) were mixed in a reaction vessel equipped with a stirrer, a condenser and a temperature probe. The mixture was held at 40° C. for 2 hours, 40° C. for 2 hours and 70° C. for 6 hours and 80° C. for 2 hours. The contents of the reaction vessel were then cooled to room temperature.

Example 69

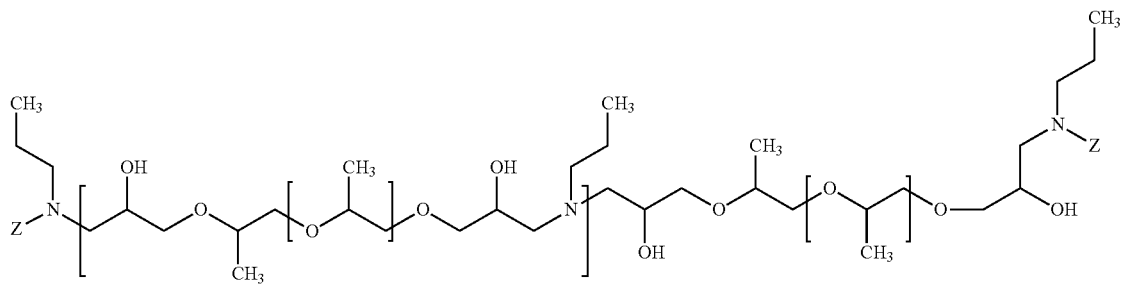

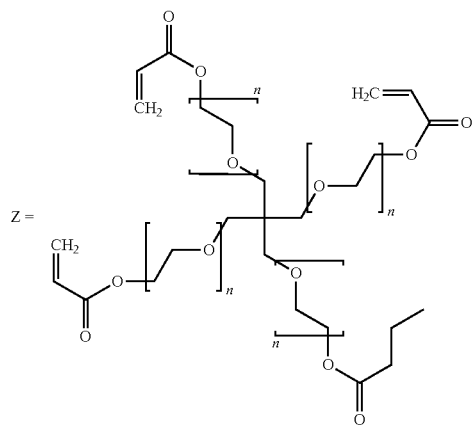
63.15 g of SR494 ex Sartomer (0.1196 moles), 0.15 g of BHT (0.0007 moles) were mixed in a reaction vessel equipped with a stirrer and air blowing thought it. 86.85 g (0.03 moles) of the product obtained in Example 68 were added into the mixture and heated at 60° C. for 3½ hours, 60° C. to 70° C. for 1 hour and 80° C. to 90° C. for 3 hours. The contents of the reaction vessel were then cooled to room temperature.
Example 70
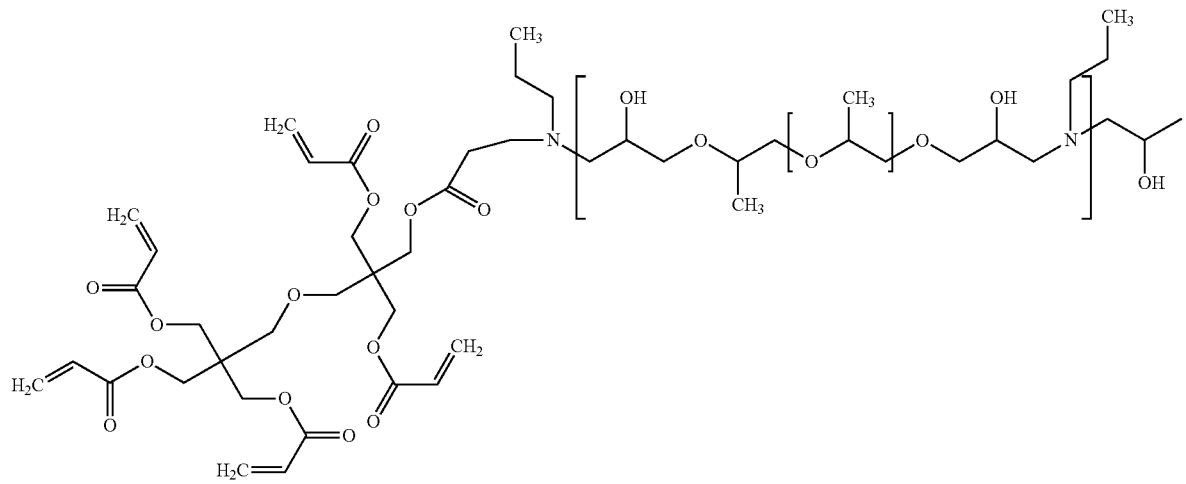

-continued

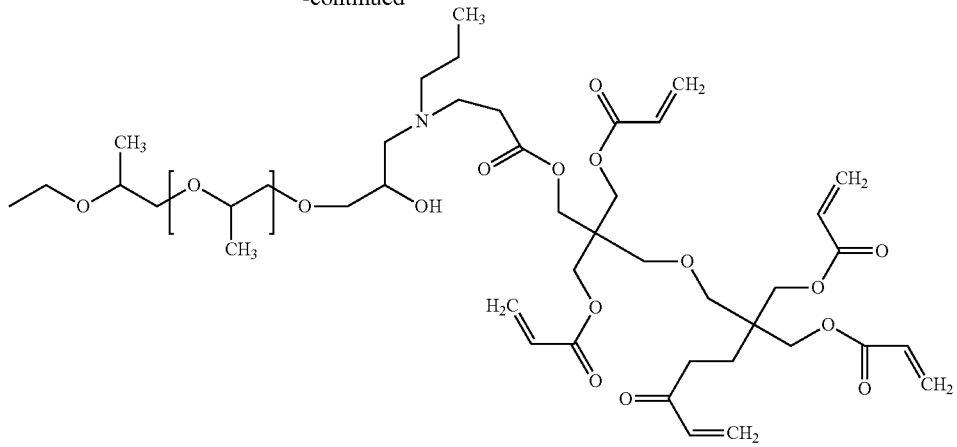

48.78 g of dipentaerythritol penta/hexa acrylate SR399 ex Sartomer (0.093 moles), 0.15 g of BHT (0.0007 moles) were mixed in a reaction vessel equipped with a stirrer and air blowing through it. 101.22 g (0.0348 moles) of the product obtained in Example 69 were added into the mixture and heated at 60° C. for 6½ hours. The contents of the reaction vessel were then cooled to room temperature.

Example 71

200 g of D.E.R™ 736P ex Dow (0.5263 moles) and 37.33 g of propylamine (0.6315 moles) were mixed in a reaction vessel equipped with a stirrer, a condenser and a temperature probe. The mixture was held at 30° C. for 6 hours, 35° C. for 4 hours, 40° C. for 3 hours, 50° C. for 2 hours and 70° C. for 2 hours. The contents of the reaction vessel were then cooled to room temperature.

Example 72

72.22 g of SR494 ex Sartomer (0.1368 moles), 0.15 g of BHT (0.0007 moles) were mixed in a reaction vessel equipped with a stirrer and air blowing through it. 77.78 g (0.0342 moles) of the product obtained in Example 71 were added into the mixture and heated at 60° C. for 2 hours and 70° C. for 2 hours. The contents of the reaction vessel were then cooled to room temperature.

Example 73

61.73 g of SR494 ex Sartomer (0.1169 moles), 0.15 g of BHT (0.0007 moles) were mixed in a reaction vessel equipped with a stirrer and air blowing through it. 88.27 g (0.039 moles) of the product obtained in Example 71 were added into the mixture and heated at 60° C. for 2 hours and 70° C. for 2 hours. The contents of the reaction vessel were then cooled to room temperature.

Example 74

450.13 g of DER 732P ex Dow (0.7033 moles) and 49.87 g of propylamine (0.8437 moles) were mixed in a reaction vessel equipped with a stirrer, a condenser and a temperature probe. The mixture was held at 30° C. for 6 hours, 40-50° C. for 6½ hours, 70° C. for 3½ hours. The contents of the reaction vessel were then cooled to room temperature to provide a similar product to that obtained in Example 7.

Example 75

266.22 g of SR494 ex Sartomer (0.504 moles), 0.72 g of BHT (0.0034 moles) were mixed in a reaction vessel equipped with a stirrer and air blowing through it. 450 g (0.126 moles) of the product obtained in Example 74 were added into the mixture and heated at 60° C. for 2 hours and 70° C. for 2 hours. The contents of the reaction vessel were then cooled to room temperature.

Example 76

Magenta ink formulations suitable for offset printing were prepared based on:

| | |
|---|---|
| IRR 645 modified epoxy acrylate ex Cytec | 17.9-22.9% |
| Example material | 36.0-47.0% |
| SR 494 ex Sartomer | 5.0-30.0% |
| C4440 stabiliser ex Kromachem | 1.3% |
| Irgalite Red RBS ex Ciba | 5.7% |
| Permanent Rubine F6B ex Clariant | 13.7% |
| Micro Talc IT Extra ex Omya UK Ltd | 3.0% |
| Polsperse 10 ex ECC International | 1.8% |

These inks were tested for viscosity, EB cure, solvent rub resistance and lithographic behaviour.

| Ink | Example material | Viscosity (poise) | Min. EB cure dose (KGy) | IPA double rubs | Water Uptake (%) |
|---|---|---|---|---|---|
| 1 | 4 | 146.5 | 10 | 7 | — |
| 2 | 13 | 153.8 | 15 | 4 | — |
| 3 | 11 | 115.6 | 5 | 9 | — |
| 4 | 7 | 176.5 | 10 | 8 | 67 |
| 5 | 8 | 164 | 10 | 7 | — |
| 6 | 19 | 138 | 5 | 15 | — |
| 7 | 15 | 156 | 5 | 30 | — |
| 8 | 17 | 146 | 5 | 25 | — |
| 9 | 30 | 105.7 | 5 | 6 | 28 |
| 10 | 23 | 152.9 | 5 | 30 | 52 |
| 11 | 25 | 128.8 | 5 | 7 | 38 |
| 12 | 26 | 146 | 5 | 12 | 40 |
| 13 | 28 | 120 | 10 | 6 | 40 |
| 14 | 32 | 94 | 15 | 6 | 47 |
| 15 | 34 | 110 | 5 | 5 | 47 |
| 16 | 40 | 132 | — | — | >40 |
| 17 | 42 | 139 | — | — | >40 |

| Ink | Example material | Viscosity (poise) | Min. EB cure dose (KGy) | IPA double rubs | Water Uptake (%) |
|---|---|---|---|---|---|
| 18 | 44 | 100 | 5 | 7 | 36 |
| 19 | 61 | — | 15 | | 54 |
| 20 | 63 | — | 10 | 6 | 36 |
| 21 | 69 | 100 | 5 | 13 | 39 |
| 22 | 72 | 124 | 5 | 11 | 32 |
| 23 | 67 | 85 | 20-30 | | 43 |
| 25 | 70 | 208 | 5 | 13 | 39 |
| 26 | 75 | 169 | 10 | 4 | 41 |
| 27 | 73 | 129.7 | 15 | 4 | 29 |

Inks were printed onto Incada Silk board substrate to a density of 1.3-1.4.

Viscosity was measured using CAP2000+Brookfield viscometer at 32° C.

EB cure dose was measured on AEB Electron Beam unit in order to give tack free cure with no thumb twist failure.

IPA double rubs was measured using cotton buds after EB curing the prints at 30 KGy.

Lithographic behaviour was evaluated on the Lithotronic ex Novocontrol using Veegra blue as the fount solution, water uptake was noted after the experiment.

These results demonstrate that the example materials as part of this invention are suitable for use as reactive oligomer in an electron beam curable offset ink formulation.

Example 77

Inks were prepared for UV cure based on the addition of 8% of a photoinitiator blend—comprising Irgacure 369 ex Ciba, Omnirad EHA ex IGM and Omnirad PBZ ex IGM—to inks 5 and 9, prepared as part of Example 76. Those inks were printed onto Incada Silk board substrate to a density of 1.3-1.4 and UV cured using an IST M-25 UV curing unit fitted with 2×500 Watts per inch medium pressure Mercury arc lamps. A single pass at 100 m/min belt speed (75 mJ/m$^2$) was used to give full cure.

Those skilled in the art having the benefit of the teachings of the present invention as hereinabove set forth, can effect numerous modifications thereto. These modifications are to be construed as being encompassed within the scope of the present invention as set forth in the appended claims.

The invention claimed is:

1. A UV or EB-curable reactive component, wherein said reactive component is the Michael addition reaction product of an amine-terminated copolymer and a multifunctional acrylate monomer, wherein said amine-terminated copolymer is the reaction product of a diglycidyl ether and an amine selected from a difunctional secondary amine or a monofunctional primary amine or a mixture thereof.

2. The reactive component of claim 1, which comprises a polymer represented by the formula (I):

$$C\text{-}B\text{-}[A\text{-}B]_n\text{-}A\text{-}B\text{-}C \qquad (I)$$

wherein:
n is from 2 to 500;
each A is individually a unit derived from the diglycidyl ether;
each B is individually a unit derived from the difunctional secondary amine or the monofunctional primary amine; and
each C is individually a unit derived from the multifunctional acrylate monomer.

3. The reactive component of claim 1, wherein the reactive component has a weight average molecular weight ($M_w$) in the range of from 2000 to 15000.

4. The reactive component of claim 1, wherein the diglycidyl ether is an aliphatic diglycidyl ether.

5. The reactive component of claim 1, wherein the diglycidyl ether has a weight average molecular weight ($M_w$) of 900 or less.

6. The reactive component of claim 1, wherein the amine is an aliphatic amine.

7. The reactive component of claim 1, wherein the amine is a primary amine.

8. The reactive component of claim 1, wherein the amine includes a functional group other than a amine group that is modified in order to adjust the hydrophobicity of the reactive component.

9. The reactive component of claim 1 wherein the multifunctional acrylate is a tri- or higher- functional acrylate.

10. The reactive component of claim 1, wherein the amine-terminated copolymer is the reaction product of the amine and a mixture of the diglycidyl ether and a monoglycidyl ether.

11. The reactive component of claim 1, wherein the amine-terminated copolymer is the reaction product of the amine and a mixture of diglycidyl ethers.

12. The reactive component of claim 1, wherein the ratio of amine to glycidyl ether is from 1.1:1 to 1.5:1.

13. The reactive component of claim 1, wherein the ratio of multifunctional acrylate to amine-terminated copolymer is at least 2:1.

14. A UV or EB-curable composition comprising the reactive component of claim 1 and at least one further UV or EB-curable component.

15. The UV or EB-curable composition of claim 14, which is an ink or coating.

16. The UV or EB-curable composition of claim 14, which is applied via offset printing.

17. The reactive component of claim 1, said reactive component being a Michael addition reaction product of:
  a. an amine-terminated copolymer of (i) a diglycidyl ether and (ii) a difunctional secondary amine or a monofunctional primary amine or a mixture of both, subsequently reacted with: b. a multifunctional acrylate monomer.

18. A method of preparing the reactive component of claim 1, said method comprising the steps of:
  a. providing an amine-terminated copolymer which is the Michael addition reaction product of (i) a diglycidyl ether, and optionally a monoglycidyl ether, and (ii) an amine, which includes two secondary or one primary amine group(s) and optionally a functional group other than an amine group;
  b. reacting the copolymers provided in step a. with a multifunctional acrylate monomer;
  the method optionally comprising c. modifying the optional functional group other than an amine group.

19. The method of claim 18, comprising the further step of preparing the amine-terminated copolymer by reacting (i) a diglycidyl ether, and optionally a monoglycidyl ether, with (ii) an amine, which includes two secondary or one primary amine group (s) and optionally a functional group other than an amine group.

20. The method of claim 18, wherein the amine-terminated copolymer is the reaction product of a mixture of two or more diglycidyl ethers and the amine.

21. The method of claim 18, wherein the amine-terminated copolymer is the reaction product of from 1.1 to 1.5 equivalents of amine and one equivalent of glycidyl ether.

22. The method of claim 18, wherein the ratio of multifunctional acrylate to amine-terminated copolymer used in step b. is at least 2:1.

23. The method of claim 18 for preparing a reactive component, wherein said reactive component is the Michael addition reaction product of an amine-terminated copolymer and a multifunctional acrylate monomer, wherein said amine-terminated copolymer is the reaction product of a diglycidyl ether and an amine selected from a difunctional secondary amine or a monofunctional primary amine or a mixture thereof.

24. The method of claim 18 comprising the additional step of mixing the reactive component with a further UV or EB-curable component.

* * * * *